Jan. 26, 1960 — G. M. GIANNINI ET AL — 2,922,869
PLASMA STREAM APPARATUS AND METHODS
Original Filed Nov. 18, 1957 — 8 Sheets-Sheet 1

INVENTORS
GABRIEL M. GIANNINI
ADRIANO C. DUCATI
ATTORNEY

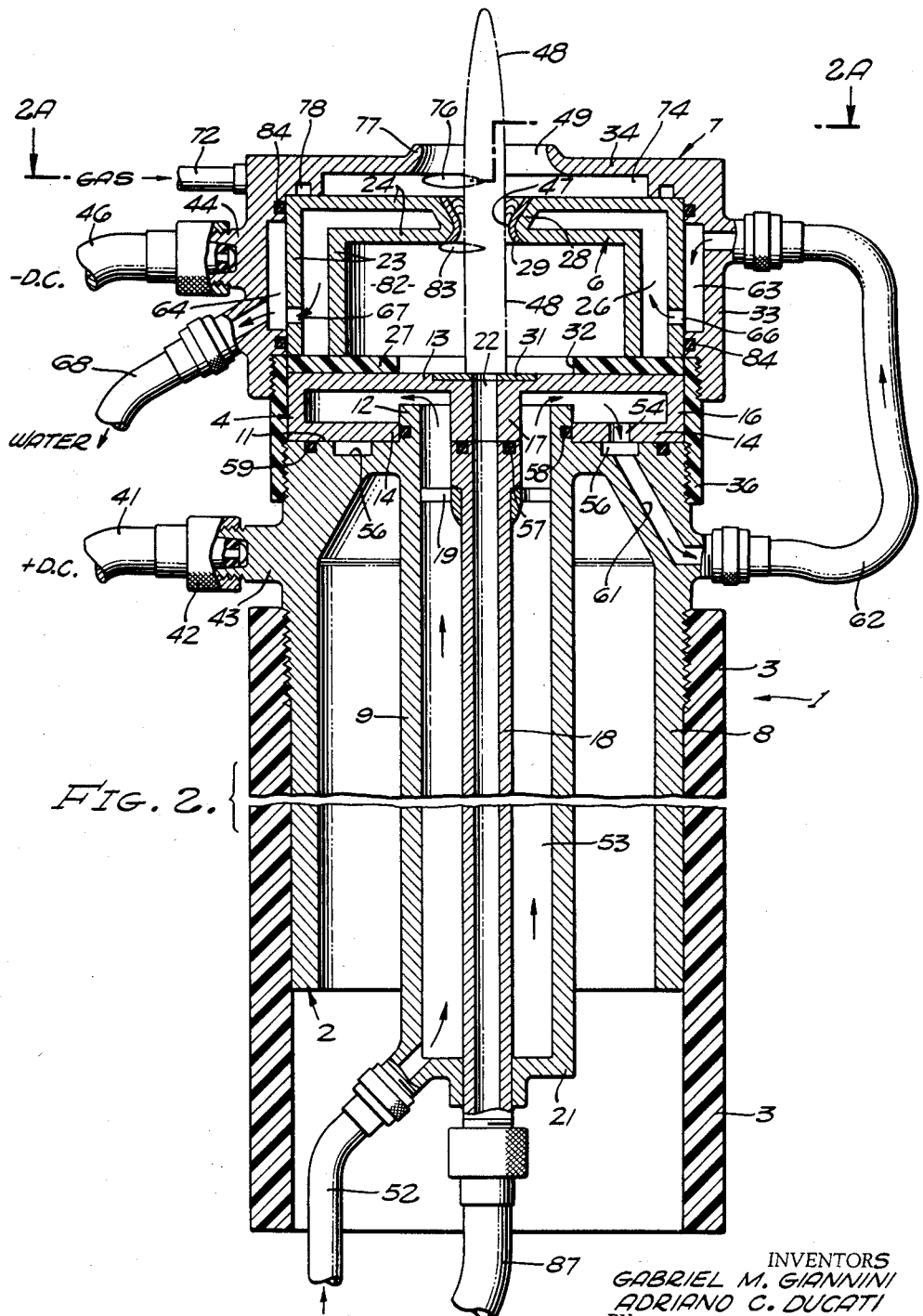

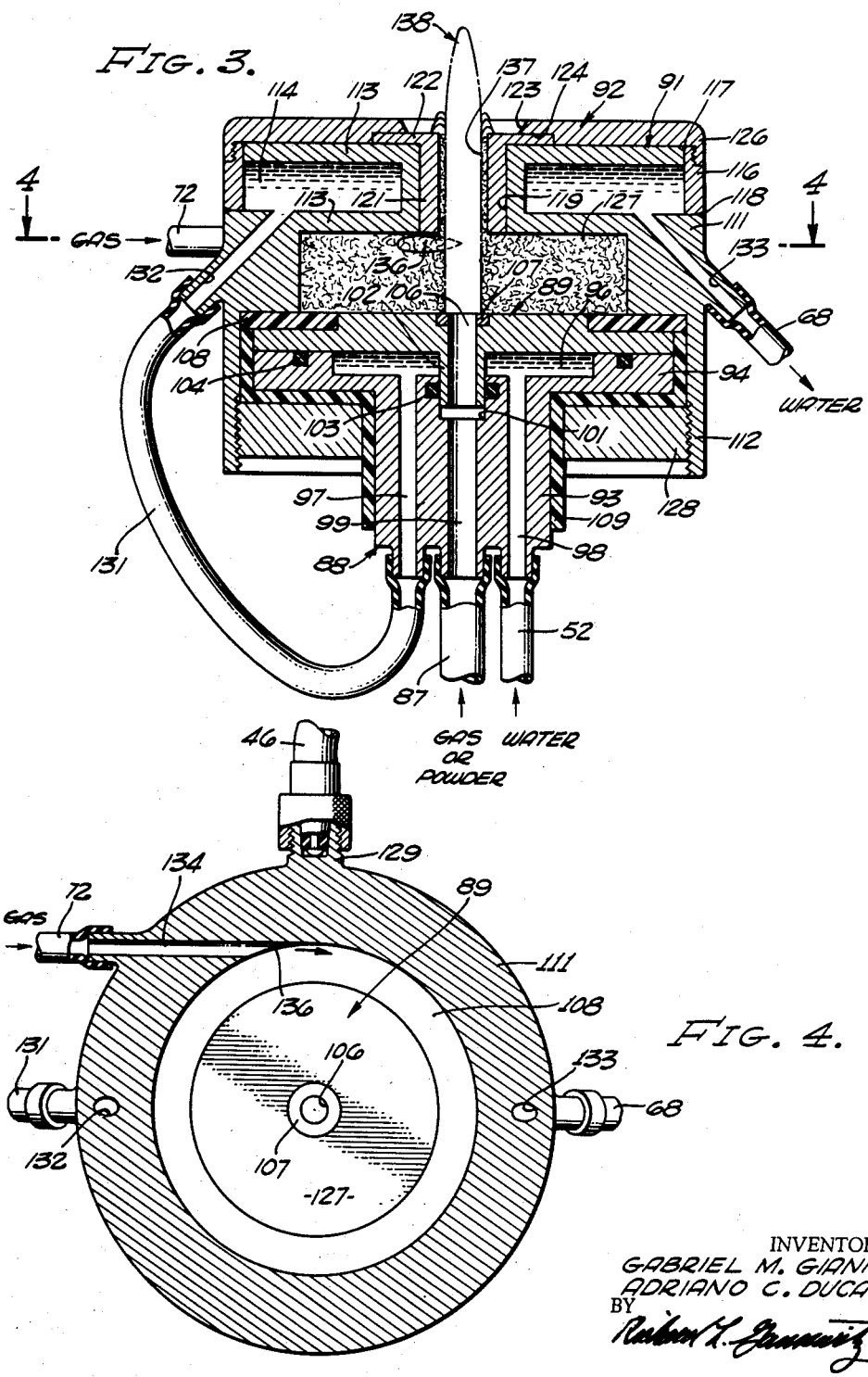

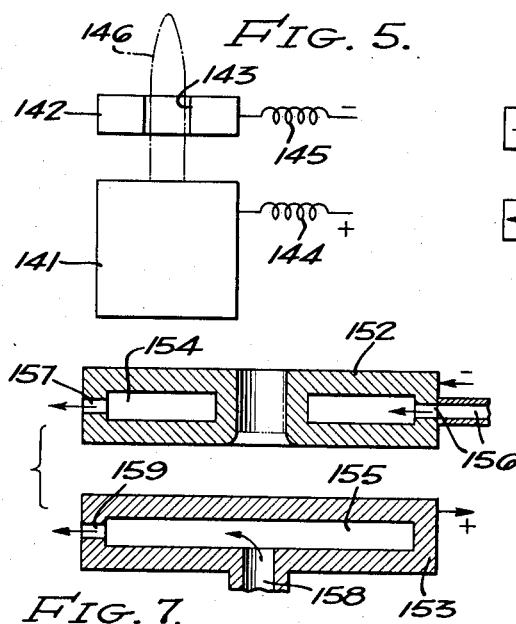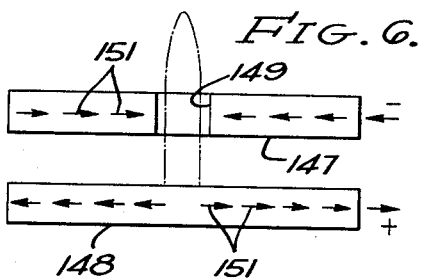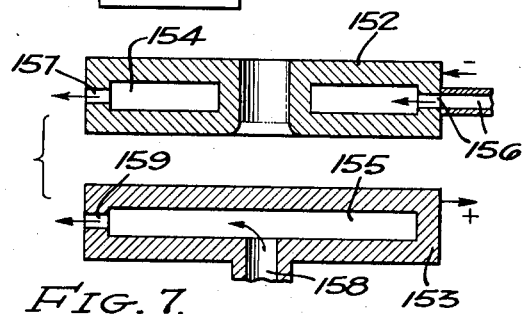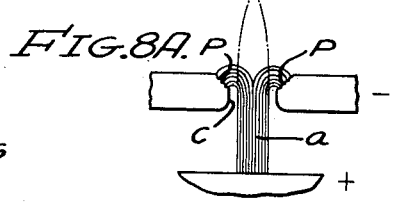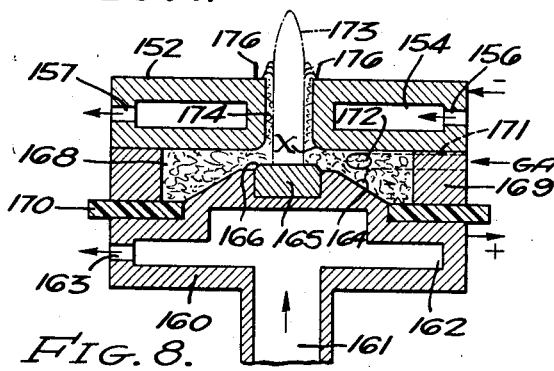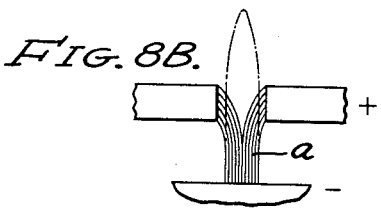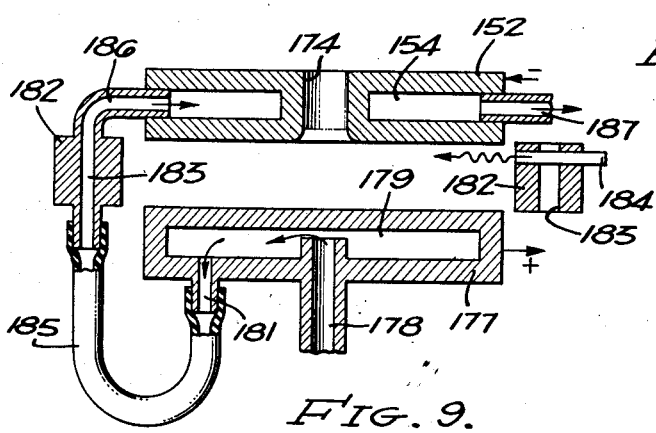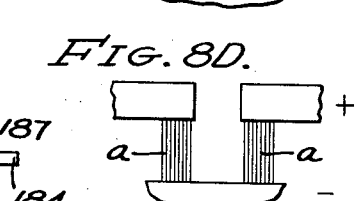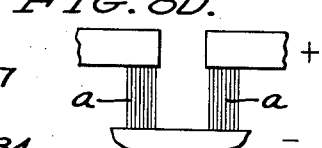

INVENTORS
GABRIEL M. GIANNINI
ADRIANO C. DUCATI
BY
ATTORNEY

Jan. 26, 1960  G. M. GIANNINI ET AL  2,922,869
PLASMA STREAM APPARATUS AND METHODS
Original Filed Nov. 18, 1957  8 Sheets-Sheet 6

INVENTORS
GABRIEL M. GIANNINI
ADRIANO C. DUCATI
BY
ATTORNEY

Jan. 26, 1960  G. M. GIANNINI ET AL  2,922,869
PLASMA STREAM APPARATUS AND METHODS
Original Filed Nov. 18, 1957  8 Sheets-Sheet 8

INVENTORS
GABRIEL M. GIANNINI
ADRIANO C. DUCATI
BY
ATTORNEY

United States Patent Office 2,922,869
Patented Jan. 26, 1960

2,922,869
PLASMA STREAM APPARATUS AND METHODS

Gabriel M. Giannini, Newport Beach, and Adriano C. Ducati, Corona Del Mar, Calif., assignors to Plasmadyne Corporation, Santa Ana, Calif., a corporation of California Continuation of application Serial No. 697,279, November 18, 1957. This application July 7, 1958, Serial No. 747,094

49 Claims. (Cl. 219—75)

This invention relates to plasma stream apparatus and methods, and more particularly to plasma stream torches, methods of creating and sustaining very high-temperature plasma streams or jets, and methods of using the same. The present application is a continuation of our co-pending application Serial No. 697,279, filed November 18, 1957, for Plasma Stream Apparatus and Methods. Said application is a continuation-in-part of our application Serial No. 649,461, filed March 29, 1957, under the same title, both now abandoned.

Streams of plasma (which has been defined as consisting of neutral gas, ions and electrons, at high temperatures) have been observed as physical phenomena for many years, for example in connection with electric arcs. Such streams have been employed to achieve very high temperatures for short periods of time. All known prior art activity in the very high-temperature field has, however, been theoretical in nature and has not been productive of practical apparatus and methods capable of commercial use in arts such as cutting, welding, metalizing, ceramic coating, surface treating, sintering, etc.

An important field of activity to which the present application is directed is the field of workpiece heating, especially localized heating, now occupied largely by gas equipment and electric arc and other devices. Electric furnaces now operate in a relatively high-temperature range, up to about 10,000° F., as do solar furnaces and certain special cutting flames such as the oxy-aluminum and Thermit flames. The high current-density torch of the present invention, however, provides sustained pure heat and much higher temperatures. The present torch normally operates in the general range of 5,000° F. to 30,000° F., and at atmospheric (or other) pressures. The upper portions of this temperature range, above 10,000° F., may be termed, for purposes of the present patent application, the very high-temperature range. Such terminology is employed despite an appreciation of the fact that much higher temperatures are present in certain instantaneous reactions, such as atomic explosions.

In addition to temperature limitations, conventional gas and arc apparatus is subject to many other limitations and defects well known to the art. For example, in connection with conventional arc devices it is necessary that the work be made a component of the electrical circuit—which eliminates this method of heating when the work is not electrically conductive. Furthermore, and very importantly, the necessity of connecting the work in the electrical circuit gives rise to numerous problems of current connection, mobility, and the like. In addition, the necessity of connecting the work in circuit makes it impractical or impossible to effect simultaneous cutting of a plate by the use of two arc devices disposed on opposite sides of the plate. The simultaneous cutting of a plate from both sides thereof is important not only in connection with cutting speed, but in connection with preventing formation of undesirable ridges along one side of the plate being cut.

Other limitations and problems with relation to conventional heating apparatus, especially as to temperature, are so numerous that it is impractical to specify them herein. Some such problems, and their solutions with the apparatus and methods of the present invention, will, however, be set forth in subsequent portions of this specification.

In view of the above and other factors characteristic of conventional heating and related equipment, it is an object of the present invention to provide practical, commercial plasma stream apparatus and methods which are not subject to the above-specified, and other, limitations and defects.

Another object is to provide apparatus and methods for effecting dynamic constriction of an electric arc by means of gas, to produce a high current-density arc and a very high-temperature plasma stream.

A further object is to provide a sustained, very high-temperature plasma stream through use of metal electrodes and with little or no contamination of the stream by electrode material.

A further object is to provide a plasma stream torch and methods in which the work need not be connected in the electrical circuit, and in which temperatures are produced which are greatly higher than those produced with conventional gas or arc equipment.

An additional object is to provide a practical and useful plasma stream torch for creating and maintaining very high temperatures, which torch has metal electrodes and will operate for relatively long periods without the necessity for replacement of parts and without loss of desirable operating characteristics.

Another object is to provide novel means and methods for protecting and cooling the electrodes of a very high-temperature plasma stream torch, to prevent such electrodes from burning or deteriorating in a short time, and to result in a long-lasting torch which is practical and useful in construction and operation.

A further object is to provide novel means and methods for injecting substances into plasma streams.

Another object is to provide novel means and methods for constricting an electric arc in a plasma stream apparatus.

A further object is to provide apparatus and methods for producing a whirling or vortical flow of gas in a plasma stream torch in order to constrict the electric arc, and also to electrically insulate portions of the torch, protect such portions from deterioration, and effect protection of work being operated upon by the torch.

A further object is to produce high-density plasma streams with electrodes having a novel electrical polarity, such plasma streams having improved characteristics including greatly elevated temperatures as compared to prior art plasma streams.

A further object is to provide novel nozzle structures for plasma stream torches.

Another object is to provide means and methods for providing fluid cooling of the components of the plasma stream apparatus, and for producing the maximum cooling effect without placing fluid seals undesirably near the plasma stream.

An additional object is to provide means and methods for preventing power losses and other undesirable effects within a plasma jet torch, such effects resulting from undesired electrical discharges between portions of the electrodes.

A further object is to provide novel interchangeable electrodes for plasma stream torches.

An additional object comprises the provision of means and methods for cooling the periphery of the torch and both electrodes thereof with but one set of intake and return coolant conduits, and without resulting in electrolysis, power losses or other undesired effects.

An additional object is to prevent starting of an electric arc on the inside (relatively adjacent the back electrode or plate) of the opening in the nozzle electrode, and to protect such nozzle from oxidation and excessive deterioration.

Another object comprises the provision of apparatus and methods for feeding large amounts of current to the electrodes of plasma stream apparatus in a radial manner, to minimize heating and power losses.

Another object is to provide novel means and methods for protecting the work being operated upon by plasma jet torches.

An additional object is to provide a method of controlling the length and characteristics of a plasma jet by regulating gas flow in the nozzle electrode.

Other objects include the provision of novel methods of ceramic spraying or metalizing metals and non-metals, welding metals and non-metals with the work not in circuit, cutting and drilling metals and non-metals with the work not in circuit, quick heating of metals and non-metals, localized and other hardening of metals, surface treating of metals and non-metals, sintering, shaping, ore refining, etc.

These and other objects and advantages of the invention will be more fully set forth in the following specification and claims, considered in connection with attached drawings to which they relate.

In the drawings:

Figure 2 is an enlarged longitudinal central sectional view of the torch, taken on line 2—2 of Figure 1;

Figure 3 is a longitudinal central sectional view of a second and more commercially practical plasma stream torch, constructed in accordance with the present invention;

Figure 4 is a section on line 4—4 of Figure 3;

Figure 5 is a schematic view, in longitudinal central section, illustrating basic components of a plasma stream torch, and indicating the electrical polarity which is preferably employed in the torch;

Figure 6 is a schematic view corresponding generally to Figure 5, but illustrating the flattened electrodes permitting radial flow of current to or from the arcing points or regions;

Figure 7 illustrates in schematic form a basic means for effecting cooling of the electrodes of the torch, to provide the maximum cooling effect near the arcing portions of the nozzle and plate;

Figure 8 is a schematic view, in longitudinal central section, illustrating means for dynamically constricting the arc and for protecting, cooling and electrically insulating portions of the electrodes of a plasma stream torch;

Figures 8A, 8B, 8C and 8D are schematic views illustrating nozzle-arc relationships with different electrical polarities and gas flow conditions;

Figure 9 is a schematic view illustrating cooling not only of the electrodes but also of the casing of the torch;

Figure 23:
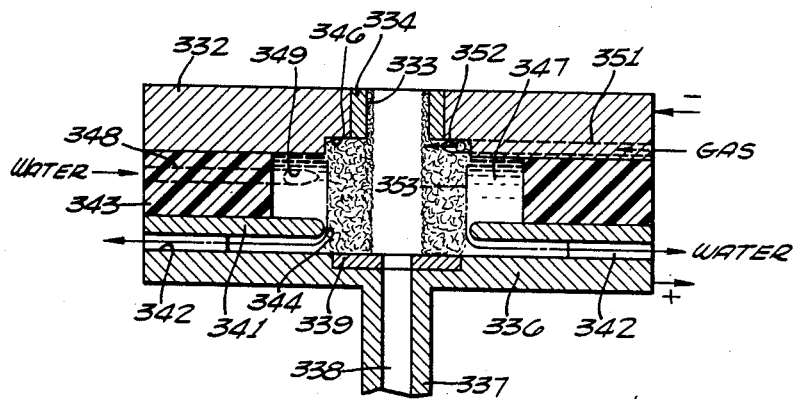
Figure 23 is a schematic longitudinal central sectional view illustrating formation of the arc passage or chamber with both gas and water.
Figure 24:
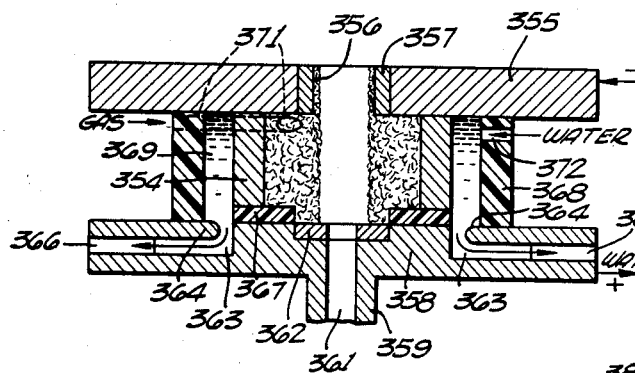
Figure 26:
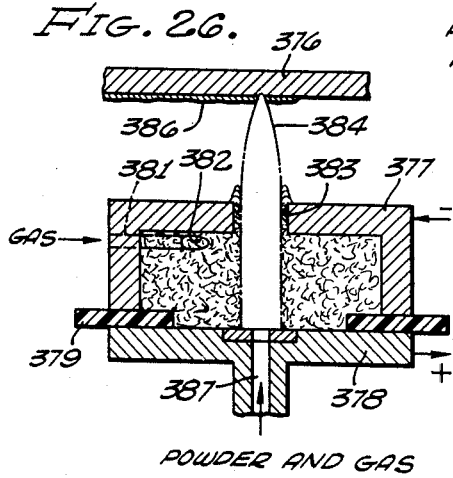
Figure 25:
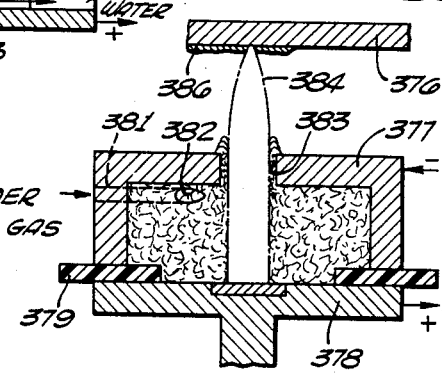
Figure 27:
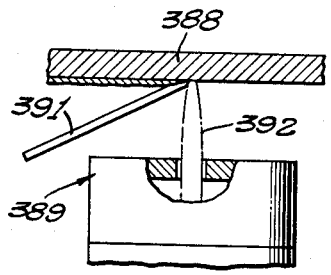
Figure 28:
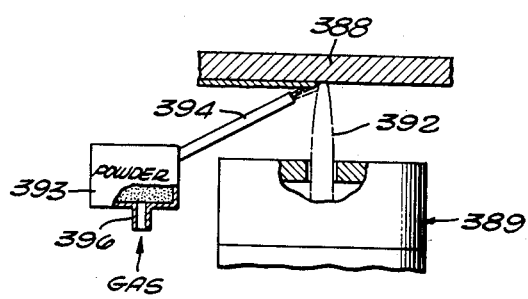
Figure 29:
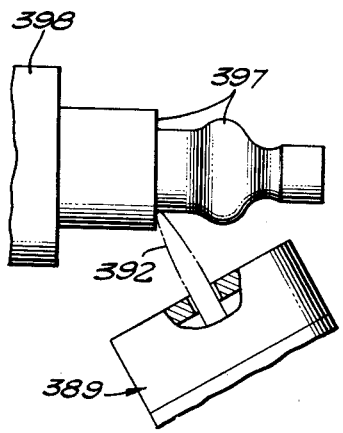
Figure 30:
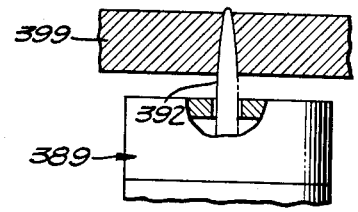
Figure 31:
Figure 30A:
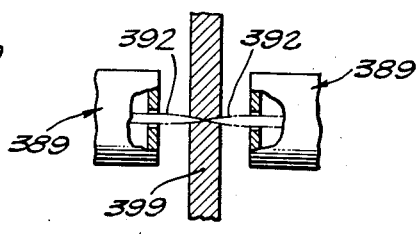

Figure 24 corresponds somewhat to Figure 23, but illustrates the use of a wall or divider between the gas and water;

Figure 25 illustrates, in schematic form, a method of coating a workpiece with a substance such as ceramic, such substance being introduced into the gas which constricts the arc and insulates and protects the nozzle;

Figure 26 corresponds somewhat to Figure 25, but illustrates the introduction of a substance through a hole in the plate electrode;

Figure 27 illustrates a method of coating a workpiece by use of the very high-temperature plasma stream torch, the coating substance being introduced into the end of the plasma stream or jet in the form of a rod or wire;

Figure 28 illustrates an additional method of coating or metalizing by use of the plasma stream torch, the coating substance being introduced externally of the torch and in particulate form;

Figure 29 illustrates a method of shaping a workpiece with the very high-temperature plasma stream torch;

Figure 30 illustrates the use of the torch in hole punching, cutting and the like;

Figure 30A illustrates cutting of a plate simultaneously from opposite sides thereof;

Figure 31 illustrates a method of welding with the torch; and

Figure 32:
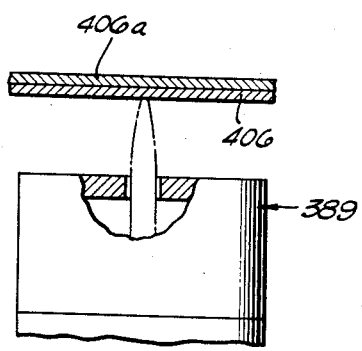

Figure 32 illustrates the use of the torch in surface treating, sintering, etc.

In the following specification there will first be described, in non-schematic form and for purposes of illustration and orientation, several embodiments (Figures 2–4) of plasma jet torches constructed in accordance with the present invention. Much of the theory and methods with relation to such very high-temperature torches will then be described, and with particular reference to schematic Figures 5–10. Thereafter, a number of forms of electrode structures will be described with reference to schematic Figures 11–19, and additional embodiments will be described with reference to the schematic showings of Figures 20–24. Methods of employing the torches are illustrated schematically in Figures 25–32, and will be described in connection therewith.

Referring first to Figures 1, 2, 2A and 2B, the very high-temperature plasma stream torch is indicated generally at 1, and is illustrated to comprise a body 2, a handle 3, a plate or base (back) electrode 4, a nozzle electrode 6, and a cap 7.

Body 2, which is formed with a good electrical conductor such as copper, has outer and inner tube portions 8 and 9, respectively, which are integrally connected at their upper ends (Figure 2). Outer tube portion 8 is threaded to receive the upper end of the handle 3, which is formed of a suitable insulating material. The extreme upper end of the body 2, where the outer and inner tube portions 8 and 9 are connected, is formed as a radial surface 11 surrounding an upstanding neck 12.

The plate or base electrode 4, also formed of a good electrical conductor such as copper, comprises a hollow disc having an upper wall 13 and a lower wall 14, the latter being open at its center so that it may fit closely around neck 12. Lower wall 14 seats on radial surface 11 of body 2 to provide good electrical contact therebetween. Current flowing from the body into wall 14 will therefore flow through the side or peripheral wall 16 of plate 4, and thus to the periphery of upper wall 13 and radially inwardly to the central or arcing portion thereof.

The central part of upper plate wall 13 is formed with an integral, downwardly extending tube or stem portion 17 which seats at its lower end on the upper end of a tube 18. Tube 18, in turn, is held by a web 19 in body portion 9, and by the lower closed end 21 of portion 9, in position along the axis of the body. It follows that material flowing through tube 18 will pass into and through the central hole or passage 22 in tube portion 17 and upper plate wall 13 for discharge into the base of the plasma stream as will be described hereinafter.

The nozzle electrode 6 is illustrated in Figure 2 to comprise a single piece of metal, again a good electrical conductor such as copper, having a cylindrical side wall 23 connected at its upper end to a radial, inwardly extending wall or disc 24. Walls 23 and 24 are both hollow and form a water chamber 26, the latter being sealed at the lower end of side wall 23 by a disc or gasket 27 formed of a suitable sealing and electrical insulating material. Formed at the center of radial wall 24 is an annular nozzle wall 28 which closes the adjacent portion of water chamber 26, and which defines the nozzle opening for the plasma jet or stream.

The shape and function of nozzle wall 28, and the electrically conductive refractory substance 29 thereon, will be described subsequently (particularly in connection with Figures 8 and 17). Similarly, the electrically conductive refractory substance 31 which is inset in the upper wall 13 of plate electrode 4 will be described in connection with Figure 19, such substance and the surrounding region of wall 13 being exposed to the electrode 6 by providing a relatively large opening 32 in the center of insulating disc 27.

The cap 7 is shaped somewhat similarly to nozzle electrode 6, having a cylindrical side wall 33 and a radially inwardly extending upper wall 34. The cap is also formed of copper or other electrical conductor, and nests closely over the nozzle to provide good electrical contact therewith. The lower end of side wall 33 is threaded over the upper end of an insulating sleeve 36 which surrounds plate side wall 16 and is itself threaded over the upper end of body 2. The construction is thus such that threading of the cap into sleeve 36, and threading of the sleeve onto body 2, produces drawing of the nozzle electrode 6 downwardly onto insulating disc 27. This, in turn, presses plate 4 downwardly onto surface 11 to provide close contact between the elements.

There will next be given a brief, preliminary description of the gas, coolant and electrical means and circuits, and of the mode of operation of the torch. A suitable source of electrical power (preferably a direct current source) is indicated at 37 in Figure 1, and is connected by means of leads 38 to a combination electrical and gas control means 39. The positive terminal of control 39 is connected through a positive lead 41 and a connector 42 to a threaded post 43 on body 2. Current thus flows into the body 2 and, as previously stated, into the central portion of upper plate wall 13. The current then flows in an electric arc from the refractory substance 31 (around opening 22) to the outer or upper portion of the refractory substance 29, as will be described in detail subsequently. The remaining portion of the electrical circuit includes nozzle electrode 6 and its abutting cap 7, a threaded post 44 on the cap, and a negative lead 46 to the negative terminal of control 39.

The arc which flows between the nozzle and plate electrodes may be struck in a conventional manner, such as by inserting a thin stick of graphite therebetween, or by momentarily impressing a high frequency voltage thereon.

The electric arc is constricted, as will be described, by gas which flows into the arc chamber and then expands outwardly through the narrow or minimum-diameter opening 47 in the nozzle, which constriction results in a high current density with consequent formation of a very high-temperature plasma jet or stream indicated at 48. This stream extends outwardly through the nozzle opening, and through a central opening 49 in cap wall 34, to provide the various useful heating effects which will be described hereinafter.

Cooling means, for maintaining the metal electrodes 4 and 6 relatively cool despite the tremendous heat generated in the arc and in the plasma stream, are illustrated to comprise a suitable source 51 of water or other coolant fluid. Source 51 is connected through an intake hose 52 to the lower end of the annulus 53 between tube 18 and tube portion 9 of the torch body. The water flows upwardly through annulus 53 and around tube portion 17, where it impinges against the lower surface of upper electrode wall 13 relatively adjacent refractory substance 31 from which the plasma stream emanates. The water then flows over the rim of neck 12 and into the hollow center portion of the electrode disc 4, after which it flows downwardly through an opening 54 in lower wall 14 and into an annular groove 56 in radial surface 11. Suitable O-rings 57–59 are provided to prevent leakage of water out of the above-described passages and chamber.

From groove 56, the water flows downwardly through a passage 61 in body 2 and thence into a hose 62 which is formed of an insulating material such as rubber. Hose 62 extends upwardly (Figure 2) to cap 7, so that the water may flow into a first semi-annular recess 63 which is provided in cap side wall 33 adjacent the outermost surface of electrode side wall 23. Recess 63 is separated from a corresponding semi-annular recess 64 by lands, not shown. The water in recess 63 flows through an opening 66 in the outer side wall 23 of electrode 6, and thence through the water chamber 26 for discharge through an opening 67 into recess 64. The water then flows through an outlet or return conduit 68 back to the water source 51 or to a suitable drain. The water in cap recesses 63 and 64 provides cooling of the cap, and the water in water chamber 26 provides cooling of the nozzle electrode 6, all as will be described in detail subsequently.

Figures 1, 2A, 2B:
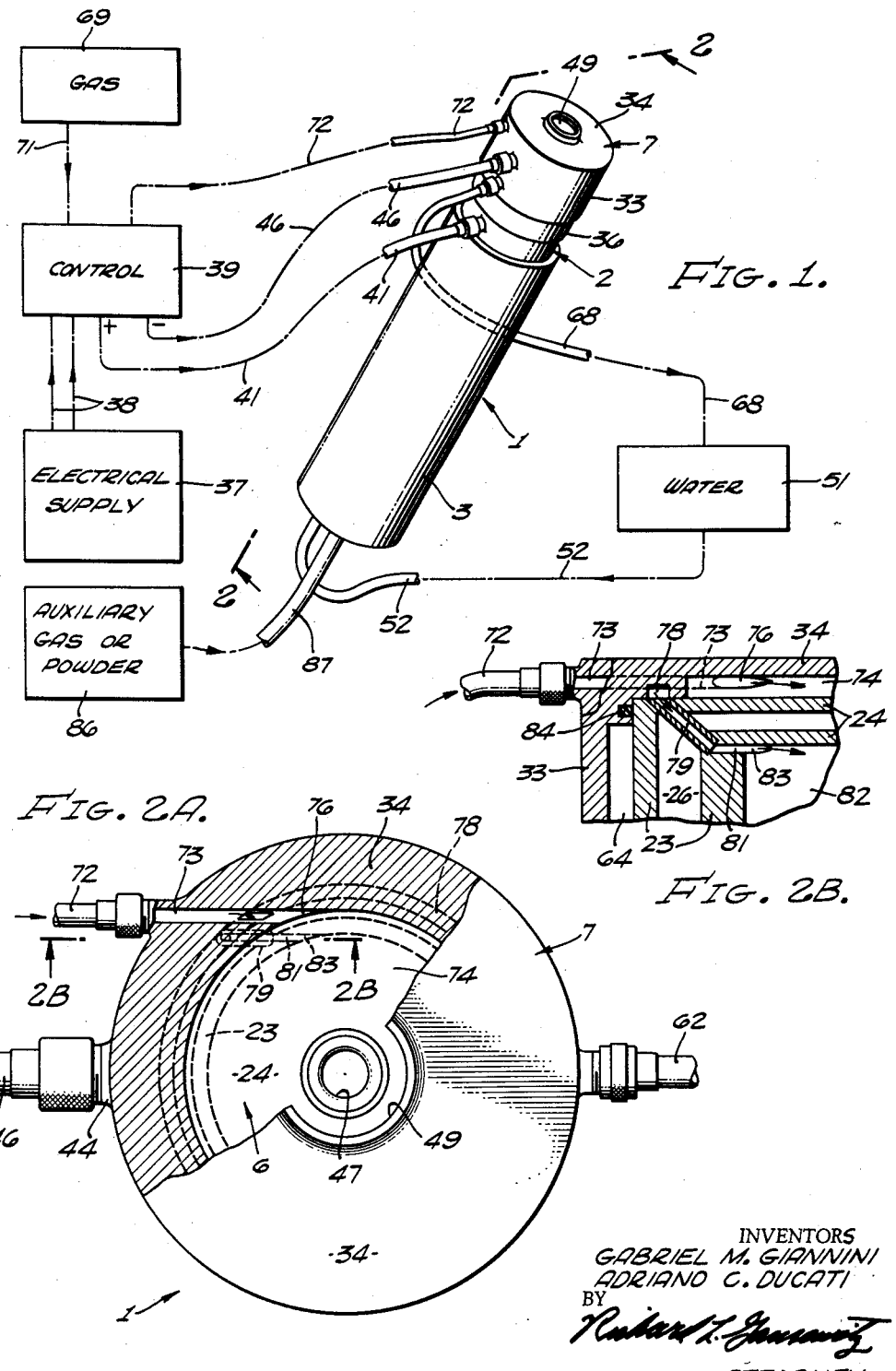
Figure 1 is a view illustrating one form of plasma stream torch, constructed in accordance with the present invention, as associated with control and supply elements which are shown schematically.
Figure 2A is a transverse view, half in section and half in end elevation, on the broken line 2A—2A of Figure 2.
Figure 2B is a fragmentary longitudinal sectional view on line 2B—2B of Figure 2A.

A source of gas is indicated at 69 in Figure 1, and is connected by a conduit 71 to the control 39. From control 39, the gas flows through a conduit 72 to the upper portion of cap 7 and into a passage 73 therein. Passage 73 (Figure 2A) is perfectly tangential to a cylindrical chamber or recess 74 which is formed in cap wall 34 and is partially closed, on its lower side, by the upper surface of electrode wall 24. The passage 73 terminates in a tangential opening 76, so that gases entering the chamber 74 follow a whirling or vortical path. The central portion of the whirling gases in chamber 74 flow outwardly along a curved lip 77 around opening 49, and thus outwardly around the plasma jet 48 to produce protective and other actions.

Passage 73 intersects and communicates with an annular channel 78 which is formed in wall 34 radially outwardly of chamber 74. Channel 78 communicates, through a tube 79 which is sealingly extended between the outer and inner components of electrode side wall 23, with a passage 81 which is tangential to the cylindrical gas or nozzle chamber 82 defined by the electrodes 4 and 6. Passage 81 enters the chamber 82 through a tangential opening 83 located closely adjacent the lower surface of wall 24. Whirling or vortical gases are thus introduced into the chamber 82, and flow (at the center or vortex) around the plasma stream 48 and upwardly through the opening 47 to provide arc constriction as well as various protective, insulating and other functions which will be described in detail hereinafter (particularly with reference to Figure 8).

It is pointed out that no O-rings need be provided to seal the annular channel 78 since any gas leakage will merely enter chamber 74. O-rings 84 are, however, provided on both sides of recesses 63 and 64 to prevent leakage of water therefrom.

Referring again to Figure 1, a source 86 of auxiliary substance (normally gas or powder) is shown as being connected through a conduit 87 to the lower end of tube 18 (Figure 2). The substance from source 86 flows through the conduit 87 and tube 18 into and through the central hole or passage 22 in tube portion 17 and upper plate wall 13. In this manner, auxiliary materials are introduced into the base of plasma stream 48 to provide various effects and functions as will be set forth subsequently.

Embodiment of Figures 3 and 4

Referring to Figures 3 and 4, an embodiment is illustrated which is more commercially practical for most purposes, and more economical to manufacture and operate, than the one previously described. In this embodiment, the body has been given the reference numeral 88, the plate electrode has been designated 89, the nozzle 91 and the cap 92. Body 88 comprises a cylinder 93 having an integral radial flange 94 at its upper end, and is formed of a good conductor such as copper. A cylindrical recess 96 is provided in the upper end of body 88 in order to receive cooling water for the plate electrode 89, such water circulating through first and second passages 97 and 98 formed longitudinally of cylinder 93 but offset from the center thereof. A third passage 99 is formed axially in cylinder 93, being provided at its upper end with a counterbore 101 which receives a stem or tube portion 102 formed axially of plate 89. Suitable O-rings 103 and 104 are provided, respectively, around stem 102 and radially outwardly of recess 96 in order to seal off the water in recess 96 as well as the material in axial passage 99.

Plate or base electrode 89 comprises a disc of copper, or other suitable conductor, having a central opening 106 which communicates through stem 102 with passage 99. An electrically-conductive refractory substance 107 is provided around opening 106 to retard deterioration thereof as will be described subsequently. At its upper, outer portion the plate disc is annularly recessed to receive in flush relationship an insulating ring or gasket 108. Such ring projects farther outwardly than the disc so that it may seat over the upper edge of an additional insulating element 109 which fits closely around and conforms to the exterior surface of body 88 and also of plate 89.

Nozzle electrode 91 is also formed of a good electrical conductor such as copper, and comprises a solid annular portion 111 having a depending cylindrical skirt 112 which fits closely around the outer surface of insulating element 109. Formed integral with the upper end of portion 111 is an inwardly extending wall or disc 113 which is made hollow to provide a water chamber 114. A short cylinder 116 is suitably brazed, at 117 and 118, around the wall 113 in order to close the water chamber 114.

Wall 113, at its axis or center, is formed with a cylindrical passage or opening 119 adapted to receive the tubular body 121 of an electrically conductive insert formed of copper or the like. A radial flange 122, provided at the upper end of body 121, seats over the upper surface of wall 113. The insert body 121 is in electrical contact with the cylindrical wall of opening 119, and also in heat conducting contact therewith, so that the insert in effect forms a part of the nozzle electrode and operates correspondingly as will be described subsequently.

The insert is removable from opening 119 and may be replaced when the amount of deterioration warrants it. Cap 92, which is formed with a central opening 123 having a substantially larger diameter than the passage in the insert body, is recessed at 124 to seat over the outer portion of insert flange 122 and thus hold the insert in position. The cap is provided with a skirt 126 which is threaded over cylinder 116, and when tightened in position, maintains the cap and insert in predetermined longitudinal positions such that the lower end of tube body 121 is flush with the upper wall of the cylindrical chamber 127 defined by electrodes 91 and 89.

In order to hold the elements in assembled condition, a retaining ring 128 is threaded into the depending skirt 112, so that it abuts against a radial wall of insulator 109 and causes flange 94 to be in close electrical contact with the lower surface of plate 89.

Current connection is made to the nozzle 91 by means of a threaded post 129 thereon (Figure 4), which post is connected to the negative lead 46 indicated in Figure 1. A corresponding post, not shown, is provided on body 88 and is connected to the positive lead 41.

The remaining portions of the coolant circuit comprise an insulating hose 131 which is connected between passage 97 and a passage 132 in nozzle portion 111, the latter passage leading to water chamber 114. Passage 98 in body 88 is connected to the water intake hose 52, and a second passage 133, extending in nozzle portion 111 from water chamber 114, is connected to the return hose 68.

The gas inlet hose 72 from control 39 is connected to a passage 134 in electrode portion 111, such passage being tangential to the chamber 127 and lying in a plane perpendicular to the axis of the torch. The passage terminates in an inlet opening 136 which is located closely adjacent the lower surface of nozzle wall 113. Gas flowing through passage 134 and entering the chamber 127 spirals inwardly, as previously indicated, and finally flows upwardly in a spiralling motion along the inner cylindrical wall of insert body 121 as illustrated at 137. This provides various functions previously indicated, and which will be described in detail subsequently, relative to the plasma stream 138.

The hose or conduit 87 from the source 86 of auxiliary gas or powder is connected to the lower end of passage 99, so that gas or powder flows upwardly through opening 106 and into the plasma jet or stream 138 as previously indicated.

The gas-constricted arc struck between metal electrodes, with consequent sustained, very high-temperature plasma jet (Figures 5–8)

Before commencing with a detailed discussion of the methods and theory of the invention, with reference to schematic Figures 5–8, certain defects of two groups or types of known prior art torches will be indicated.

In a number of prior art torches, which may be classified in one such group, plasma was generated by means of an electric arc struck between metal electrodes, and was blown by gas through an opening in one of the electrodes. With relation to some such torches, it was claimed that the arc and plasma were surrounded by whirling gas. However, in no such torch was the arc constricted. There was, therefore, no high current-density arc and no very high-temperature plasma stream. The useful temperatures achieved with such torches were tens of thousands of degrees lower than those obtainable with the present torch. The current densities in the arc were hundreds or thousands of times lower than in the present torch.

Torches in the other such prior art group incorporated a nozzle electrode formed of carbon, and a back electrode also formed of carbon. Whirling water was employed to constrict the arc passing between such electrodes, and cause passage of a plasma jet through the nozzle opening. High current densities and temperatures were achieved, but only continued for a few seconds before the jet became unstable and then extinguished as the result of rapid deterioration of the carbon nozzle. The whirling water was not passed through the nozzle opening, and could not protect the wall of the opening from deterioration. Furthermore, the plasma was greatly contaminated by vaporized carbon. Because of these and other important factors, such torches were used only experimentally and not practically or commercially.

In connection with the last-mentioned group of prior art torches, it is to be understood that the generation of a plasma jet with carbon electrodes is very different from plasma jet generation with metal electrodes. This is largely because carbon is a poor conductor of heat and will, therefore, vaporize very rapidly at the nozzle opening to provide material which makes up the plasma stream. This is not true of metals, especially highly conductive ones which are water cooled. An important contribution to the art made by applicants, therefore, is the provision of apparatus and methods which will maintain high current-density plasma streams with metal electrodes, and without resulting in undesirably fast burning or deterioration of such electrodes.

Referring now to schematic Figure 5, an elongated base or back electrode is indicated at 141. The nozzle is indicated at 142 and has an opening 143. Current is applied to the base and nozzle through leads 144 and 145, respectively, and may result under proper conditions in generation of a plasma jet 146. As thus far described, Figure 5 generally indicates not only certain basic components of the present torch, but also some of the prior art torches referred to above. The indicated electrical polarity, however, is an important feature of the present invention. Such polarity, with the nozzle negative, will be discussed under the next sub-heading.

Schematic Figure 6 illustrates a feature of the invention whereby the small-diameter, relatively long elements of Figure 5 are made large in diameter and relatively short or thin (in comparison to their diameters). This is to accommodate the enormous currents present in the torch. More specifically, the nozzle 147 of Figure 6 is illustrated as being a relatively large-diameter disc as compared to the ring 142 shown in Figure 5, and the plate (base or back electrode) 148 is also of large diameter and is a relatively thin disc as distinguished from the elongated cylinder 141 shown in Figure 5. A great advantage of this electrode construction is that the current connections may be of large area and made about the peripheries of the plate and nozzle, so that the electrons flow radially (instead of axially) to concentrate at the central nozzle opening 149 and the adjacent plate surface, as indicated by the arrows 151. These arrows 151 indicate the electron flow directions, opposite to conventional current flow directions, which (with the above-described current connections shown by the polarity signs) are seen to be radially inwardly toward the nozzle opening 149, and radially outwardly from the center of plate 148. The described arrangement greatly reduces the heating (both resistance heating and contact heating) at points remote from the jet, where heating is not desired, and results in greater torch efficiency and in other advantages. The electrodes are formed of highly conductive metal, such as copper.

Referring next to Figure 7, the construction is generally the same as that shown in Figure 6 except that the nozzle 152 and plate 153 are made somewhat thicker so that water chambers 154 and 155, respectively, may be formed therein. The water inlet to nozzle chamber 154 is indicated at 156, and the outlet 157 is shown as being diametrically opposite thereto. The plate water inlet 158 is axial, so that the coolest water impinges directly against the center of the upper plate wall to provide the maximum cooling action thereat. Thereafter, the plate cooling water flows radially outwardly for discharge through the water outlet shown at 159.

Referring next to schematic Figure 8, the nozzle is shown as being constructed the same as in Figure 7, and has been given the same reference numeral 152. The plate 160 is provided with cooling water through a passage 161, the water being fed into cooling chamber 162 and then out an outlet opening 163.

Plate 160 is shown in Figure 8 as having a frustoconical wall 164 which is coaxial with the nozzle opening. Such wall terminates, adjacent the nozzle opening, in a round radial surface into which is inset (such as by casting) a cylindrical block 165 of a refractory metal such as tungsten. The block 165 is shown as protruding above the plate body into which it is inset, and as having a beveled annular edge 166 which is coaxial with the nozzle opening and has a somewhat larger diameter. The plate construction shown in Figure 8 may be considered as being correspondingly present in views such as Figures 2, 3, 8A, 9, 19, 18, 19, 20, 21, and 22.

An annular gas or nozzle chamber 168 is shown in Figure 8 as being defined between the plate and nozzle, and coaxial with the nozzle opening, by a metal ring 169, there being an insulating gasket 170 provided between such ring and the plate. Gasket 170 is flush with the lower edge of plate wall 164. Gas is introduced into the chamber 168, preferably at a point adjacent the under surface of nozzle 152, through a tangential passage 171 and inlet 172 corresponding to the passage 134 and inlet 136 illustrated in Figure 4. The gas flow is from the source 69 (Figure 1), either directly or through the control 39, and the tangential relationship causes the gas to whirl or spiral around the cylindrical chamber 168 in the vortical action mentioned in connection with Figures 2–4. The result is that the entire chamber 168 is filled with gas, as shown, except for a cylindrical passage or chamber (vortex) at the axis of the chamber 168 and through which the arc and plasma jet pass as indicated at 173. The whirling gas which surrounds the jet 173 flows, in a whirling or vortical action, outwardly (upwardly) through the nozzle opening 174. It is to be understood that the plasma jet 173 is in large part made up of very hot neutral gas (as well as ions and electrons) drawn from the wall of the vortex. The water cooling means, and the electrical connections, are the same in Figure 8 as described with relation to Figures 5–7.

The plate construction shown in Figure 8 provides a number of advantages relative to gas flow, arc stability, electrode life, etc. Since the outer surface of the refractory block 165 is closed to the nozzle than are other portions of the plate, along frustoconical wall 164, an additional factor is provided causing the arc to remain in contact with block 165 and not with non-refractory portions of the plate. This produces, in combination with other important factors stated elsewhere in this specification, a highly stable arc and plasma jet.

It is pointed out that the outer surface of the block 165 is located close to the nozzle, the spacing therebetween being shown as less than the diameter of nozzle opening 174. This also is a factor tending to produce a highly stable arc, and minimized electrode deterioration. The wall of the nozzle opening should be formed of refractory metal, as described elsewhere in this specification.

The flow of gas in the annular chamber 168 is, as previously indicated, vortical. Such gas spirals inwardly at increasing velocity because of the presence of tapered wall 164. The gas portion immediately around the vortex flows smoothly over beveled edge 166 and around the inner nozzle edge defining the nozzle opening, such edge being grounded or beveled as stated hereinafter. The result of such gas flow is that the arc is stable and properly constricted. Furthermore, when the proper electrical polarity is employed (as stated below) the arc is prevented from contacting the nozzle region which is relatively adjacent the plate.

Certain important functions relative to the gas flow through inlet 172 of the present torch will now be stated, with reference to Figure 8. These functions include—

(a) Dynamically constricting the arc and plasma 173;
(b) Effecting such constriction efficiently;
(c) Protecting of the work from oxidation; and
(d) Protecting the electrodes (particularly the nozzle) from rapid deterioration.

Function (a), dynamic constriction, is achieved by causing the gas in chamber 168 to be relatively cool and dense at all points except in the vortex or arc passage. The gas is relatively cool because of the described water cooling of the electrodes, which are good heat conductors, and because the gas is caused to flow through the chamber 168 at a relatively high rate of speed. The gas is dense because the pressure in chamber 168, around the vortex is caused to be relatively high.

The relatively cool, dense gas in chamber 168, around the vortex or arc passage, is not appreciably ionized and, therefore, does not conduct electricity. Since the gas acts as an electrical insulator, it follows that the arc and plasma 173 must flow through the cylindrical vortex at the axis or center of the chamber. The resulting constriction of the arc means that increased currents will produce increased temperatures, instead of merely increasing the cross-sectional area of the arc and plasma as would occur if there were no constriction.

Constriction of the arc is further achieved by a phenomenon which may be termed "thermal pinch." Thermal pinch takes place because the relatively dense and cool gas in chamber 168 effects cooling of the outer or peripheral regions of the plasma. This lowers ionization and conductivity in such outer regions, with the result that the current concentrates at the center or axis of the vortex. At very high currents (on the order of 2,000 amperes), another phenomenon becomes appreciable and aids in constriction of the arc. This last-mentioned phenomenon is a magnetohydrodynamic effect which may be termed "magnetic pinch."

In order to achieve a satisfactory gas density in chamber 168, to thus effect arc constriction as above stated, the absolute gas pressure at inlet 172 should be at least 1.6 times the absolute ambient pressure (outside the nozzle opening). Thus, where the torch is employed under atmospheric pressure, the gas pressure at inlet 172 should be, at least about 9 p.s.i. gauge. It is preferred that the gas pressure at inlet 172 be higher, for example 75 p.s.i. gauge, the normal working range being between 9 p.s.i. gauge and 200 p.s.i. gauge when the torch is employed under atmospheric pressure. Such gas pressures are substantially uniform longitudinally and circumferentially of the torch within chamber 168, along the interior wall of ring 169.

Throughout this specification and claims, the "gas pressure at the inlet 172," and similar phrases, denote the pressure at such inlet but within chamber 168, after any initial expansion through the inlet opening.

Not only should the gas inlet pressure be relatively high, but the gas pressure gradient adjacent the vortex should be steep. Ideally, the gas pressure in chamber 168 should drop abruptly to about zero gauge at the vortex. This would produce a perfectly defined gas wall around the vortex. Although such perfect definition of the gas wall around the vortex or arc passage is not practical or possible, good definition is achieved by the following empirical method: A manometer-probe is inserted into chamber 168 and employed to sample the pressure at various radial positions. Such factors as the diameters of the inlet and outlet openings 172 and 174 are then altered until the gas pressure gradient is very steep at the vortex wall region, within the desired range of gas pressures.

Other factors being equal, the pressure gradient becomes steeper as the gas inlet pressure is increased. Such increase in pressure also reduces the diameter of the vortex and further constricts the arc and plasma.

Function (b), effecting arc constriction in a relatively efficient manner, is achieved because gas is employed instead of water, for example. It is stated above that the whirling gas in chamber 168 is relatively cool. The term "relatively" is employed because the gas is actually quite hot although it is much cooler than the arc or plasma. The gas temperature near the plasma in chamber 168, and along the wall of nozzle opening 174, may be on the order of 3,000° F. Such gas may nevertheless perform the above-stated function of constricting the arc, and the function of protecting the electrodes from rapid deterioration as will be described below.

It will be understood that the passing of such heated gas through the nozzle opening adds to the useful heat external to the torch. This is in contrast to the type of prior-art torch in which whirling water was employed to constrict the arc, since such water was returned to a drain. The heat in the bulk of the water was thus wasted, although it is appreciated that some of the water turned to steam and thus passed out the nozzle opening.

In order to achieve the desired torch efficiency, and other beneficial results, the diameter of chamber 168 should be made at least twice the diameter of nozzle opening 174 at its narrowest point. This prevents excessive cooling of the gas near the plasma, and the plasma itself, by the electrode cooling water. It follows that the amount of heat lost in the electrode (and casing) cooling water is minimized, and the amount of heat which passes through the nozzle opening is a maximum. It is to be remembered that for most purposes the heat inside the torch is not important, the desired result being to create maximum heat in the external plasma jet.

Function (c), protecting or shielding the work from oxidation, is achieved by employing an oxidation-preventing (preferably inert or noble) gas to effect arc constriction, and passing such gas through the nozzle opening. The noble gas surrounds the external plasma jet at the point where the pet impinges against the work, thereby shielding the work from oxidation. The shielding is effected without undesirably cooling the work, since the noble gas is heated in the torch as set forth above. It is pointed out that water and water vapor dissociate to form oxygen, and that such oxygen (in contrast to inert or noble gases) is very detrimental to the metal (such as tungsten) electrodes.

Function (d), that of protecting the electrodes from rapid deterioration, is achieved by employing an oxidation-preventing (preferably noble or inert) gas as the above-described arc-constricting gas in chamber 168, and passing such gas through nozzle opening 174. The electrical polarity is also important in this connection, as will be described under the next sub-heading. The wall of opening 174 is thus protected by the gas, such gas being relatively nonionized because of its rapid flow and because of the water cooling of the nozzle. Since the nozzle opening wall is protected by nonionized gas, it follows that the arc is caused to pass through the opening 174 along with the plasma. The arc therefore enters the nozzle at the nozzle region, indicated at 176, relatively remote from the plate. Reentry may occur at region 176 because the gas, in expanding through the nozzle opening, diffuses at the upper nozzle portion and thus may become sufficiently ionized to conduct the arc.

By way of definition of terms, it may be stated that the "arc" is made up of those ions and electrons which pass between the nozzle and plate, and form part of the electric circuit. The "plasma," on the other hand, may be defined as those ions and electrons (plus heated neutral gas) which stream or jet upwardly from the plate and outwardly through the nozzle to the region indicated at the extreme upper part of Figure 8.

To amplify upon the above description of function (d) performed by the gas, the striking of the arc at nozzle region 176, and not at the nozzle region surrounding the lower end of opening or passage 174, effects the following desired results. In the first place, the plasma jet, which is an incident to the arc, is necessarily caused to flow through the nozzle opening 174 and outside the torch where it can perform useful work, this in contrast to situations in which the arc and jet are completely confined inside of the chamber 163. In the second place, the striking of the arc in the region 176 results in preservation of the smoothness and perfection of the cylindrical wall of opening 174, as well as of the under surface of nozzle 152, by preventing oxidation and the formation of pits which would cause turbulence in the whirling gas flow and consequent reduction in the insulating and protective action performed by the gas. In the third place, the striking of the arc in region 176, or at least at points spaced above the lower end of the nozzle opening, is important to the maintenance of a constriction of predetermined size, this in contrast to constructions in which the constriction becomes increasingly larger due to a burning and eroding action, which enlargement of the constriction reduces the temperature of the plasma jet for a given power input to the torch. In the fourth place, the portion of the arc outside the torch adds to the external, useful heat. The whirling gas around the jet 173 in opening 174, and also in chamber 168, provides a cooling action which cooperates with the action of the water in chambers 154 and 162 to prevent rapid deterioration of the electrodes and excessive heating of the torch.

It is pointed out that the above actions are interdependent or cumulative. If substantial and continued arcing occurs at the nozzle region surrounding the nozzle opening and adjacent the plate, instead of relatively remote therefrom, such region will become highly pitted and eroded. When the polarity of the nozzle is positive, the pitting and erosion will then become progressively greater until the constriction diameter is enlarged excessively, or until the plasma no longer passes through the nozzle but instead remains inside the torch.

Figure 11:
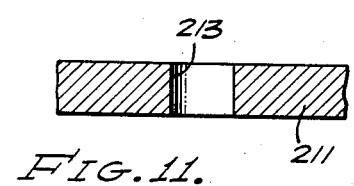
Figures 11–19 are fragmentary longitudinal central sectional views illustrating various forms of nozzle and plate electrodes, and various means for protecting the same with electrically-conductive refractory substances.
Figure 12:
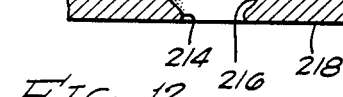

The nozzle region surrounding the nozzle opening, and adjacent the back electrode, should be rounded or beveled, for example as shown in Figure 12 or at $x$ in Figure 8. This being the case, the bevel $x$ in Figure 8 may be considered as being correspondingly present in views such as are shown in Figures 3, 10, 11, 14, 15, 16, 20, 21, 22, 23 and 24. The purpose of eliminating the sharp edge at the inner end of the nozzle opening is to maintain a relatively smooth, turbulence-free gas flow out the opening—without creating any shock or choke effects. This aids the relatively inexperienced operator in effecting proper initial operation of the torch, in such manner that the arc passes through the nozzle opening.

It is to be understood that an experienced operator may (such as by using a relatively high current) substantially immediately cause the arc to pass through the nozzle opening of the torch, even though the inner end of the opening is initially defined by a relatively sharp edge. Even an inexperienced operator may cause the arc to pass through the nozzle opening after such a torch has operated a short period of time, such as five or ten minutes. The latter is because the sharp inner edge of the nozzle, around the nozzle opening, is burned away during the initial operating period, to result in a beveled edge. Thereafter, assuming the nozzle is of negative polarity and the gas flow conditions are proper, the arc will pass through the opening and operation may be continued for hours.

*Advantages of making the nozzle negative (Figures 8, 8A, 8B, 8C and 8D)*

The passing of the arc (not merely the plasma) through the nozzle opening 174, or at least into such opening until substantially all terminal portions of the arc are spaced from the under (inner) surface of the nozzle, is not only dependent upon the gas but also upon the electrical polarity employed. Stated otherwise, the gas flow through inlet 172 and out nozzle opening 174 cooperates with the preferred electrical polarity to produce the very desirable results stated under function (d) of the previous sub-heading. Such preferred electrical polarity, as previously indicated, comprises making the nozzle negative and the plate (back or base electrode) positive.

So far as is known to applicants, all prior art workers made the plate negative and the nozzle positive, or else employed alternating current. The advantages of making the nozzle negative were not appreciated. Some prior art workers claimed to "blow" the arc through an opening in one of the electrodes, but this was in reference to low-current arcs which were not constricted. The present arc, having a very high current density, is extremely stable and is made up of ions and electrons moving at very high velocities. The present arc is, therefore, not readily susceptible to being "blown" by the gas, and (in experiments to date) will not pass through the nozzle opening unless the indicated electrical polarity is employed.

Certain of the previously stated advantages of causing the arc to pass through the nozzle opening will now be further explained and amplified upon, with reference to schematic Figures 8A, 8B, 8C and 8D. Referring first to Figure 8A, wherein the nozzle is negative as desired, the electric arc is indicated at "a." This view shows a nozzle (like that of Figure 8) after substantial use. The pitting or eroding action caused by the arc is, as illustrated at "p," substantially confined to the nozzle region surrounding the nozzle opening and relatively remote from the plate. This leaves the portion of the nozzle opening wall adjacent the plate, indicated at "c," in its original condition so that it will effect uniform constriction of the arc "a" passing through the opening. Stated otherwise, since portion "c" remains perfect, the diameter of the vortex or passage through the gas, and through which the arc passes, remains uniform (for a given gas flow rate) and results in uniform constriction of the arc even after long use of the torch.

Referring next to Figures 8B and 8C, it has been found, in experiments to date, that the illustrated conditions of the arc "a" normally occur when the nozzle is positive and the plate negative. Figure 8B shows the arcing with a new nozzle electrode, and Figure 8C shows the condition of the arc and the same nozzle electrode after a substantial period of use. The arc "a" is seen to emanate from the wall of the nozzle opening at points adjacent the plate, and despite the described insulation effects produced by the gas. This (Figure 8C) results in pitting and erosion at "q," and causes the arc to fan out or diverge upwardly. It may thus be seen that the arc is no longer constricted to its original diameter (Figure 8B) but instead has a larger diameter (Figure 8C) which reduces the temperature of the arc for a given power input.

Figure 8D illustrates the extremely bad condition in which the arc does not enter the nozzle opening. Under such circumstances, which may occur when the nozzle is positive or when the gas flow is improper, the torch merely burns or melts while producing little or no desirable results.

The preferred negative polarity of the nozzle (Figures 8 and 8A) is highly important in at least one other regard. With such polarity, the temperature of the plasma jet is very greatly increased as compared to situations in which the nozzle is positive (Figure 8C). The temperature increase is sometimes on the order of 50%. Regarding the theory of such increased temperature when the nozzle is negative, it is applicants' belief that the momentum of ions in the plasma jet is considerably higher, and that of electrons lower, as compared to situations in which the nozzle is positive. It follows that a greater temperature will result in the plasma jet because of the greater momentum thereof and consequent release of increased kinetic energy when the jet impinges against the work. Furthermore, when the nozzle is negative a portion of the arc is outside the torch where it produces available and useful heat.

As previously indicated, it is not always necessary that the arc extend clear to the outer surface of the nozzle. The basic concept is that there should be a substantial portion of the wall of the nozzle opening, relatively adjacent the plate or back electrode, which is free of arcing. This can occur even though arcing occurs from portions of the nozzle opening wall relatively remote from the plate.

*Description of such factors as ranges of voltage and current, etc.*

Stated generally, the present torch is a high-current, low-voltage device. It is not to be confused with torches in which a high voltage is impressed between two electrodes in order to cause passage of a low-current (and low-current density) arc therebetween.

The currents for a normal size torch, constructed in accordance with the present invention, range between 20 amperes and 2,000 amperes. It is to be understood, however, that very large torches may employ higher currents, and that very small torches may employ lower ones, down to 5 amps, or even less.

The normal voltage range in the present torch is between 20 volts and 500 volts, but again there may be exceptions for torches of unusual size.

The distance between plate and nozzle, at the nozzle opening, should be small. Stated generally, the spacing between the plate and nozzle, at the nozzle opening, should be about 0.3 to 2 times the diameter of the nozzle opening at its narrowest (most constricted) point. The plate-nozzle spacing (at the nozzle opening) should not be more than 4 times the minimum diameter of the nozzle opening.

The normal range of minimum diameters of the nozzle opening is $1/32$ inch to 1 inch. This same normal range applies to spacing between plate and nozzle, at the nozzle opening. As before there are exceptions, such as in the case of monstrously large torches for special purposes.

The normal over-all diameter of a commercial torch is between one and ten inches. Such diameter, in each instance, is normally substantially greater than the length or axial dimension of the torch (excluding the handle).

The cross-sectional area of the nozzle opening at its most constricted point is governed largely by the desired power input to the torch, but also varies widely in accordance with a number of other factors. Stated generally, however, such area and the power input are directly proportional. For example, where the opening diameter is $1/32$ inch the power input may be one kilowatt. For a $1/16$ inch opening diameter the power input may be four kilowatts, and for a $1/4$ inch diameter opening the power input may be on the order of 64 kilowatts. These opening diameters, and power inputs, are representative for torches such as may be used for cutting, etc.

The amount of arc constriction obtainable with the present torch is very great. For example, 500 amperes of current have been passed through a nozzle opening less than $1/16$ inch in diameter. It may thus be understood that enormously high temperatures (5,000° F.–30,000° F.) are achieved.

As previously indicated, the gas employed to effect arc constriction should be non-oxidizing (oxidation preventing), and preferably noble or inert in most instances. Argon is preferred, but other inert gases, such as helium, are suitable. Nitrogen and hydrogen have been successfully employed. Oxidizing gases, such as air, should only be employed in special situations where electrode life is not important, and a special composition of plasma is desired.

The gas pressure in the arc chamber has been discussed previously, in connection with arc constriction. The rate of tangential or vortical gas flow varies widely in accordance with pressure requirements, and in accordance with other factors. The rate of tangential flow should not be so high as to prevent striking or maintenance of the arc, but should be sufficiently high to produce arc constriction and the other actions or effects previously indicated. Also, since argon and similar gases are relatively expensive, the gas flow should not be higher than necessary. It has been found, with a torch of the type shown in Figures 3 and 4 and having an outer diameter on the order of one to four inches, and properly sized chambers and passages, that a gas flow through passage 134 (Figure 4) of approximately 50 cubic feet per hour is satisfactory. The range is quite great, however, and many other gas flow rates (such as 36 cubic feet per hour) may be satisfactory. Such values produce a relatively rapid gas flow, such as 117 feet per second, and consequent vortical action.

The gas inlet, such as is indicated at 136 in Figure 4, is preferably relatively small in a torch of the size indicated. The diameter of such gas inlet should be less than the diameter of the nozzle opening at its narrowest (most constricted) point, and is preferably about ½ such minimum diameter of the nozzle opening. The exact relationship is, however, determined emperically as previously stated. Typical diameters of the gas inlet, for a torch of the general size stated, range from $1/64$ inch to ½ inch.

The following is a table of currents, voltages, and gas inlet pressures for a typical torch in which argon is employed as the whirling gas, the plate-nozzle distance being ¼ inch:

| Current (Amperes) | Voltage (Volts) | Pressure at the Gas Inlet Opening, Such as Opening 136 in Figure 4 (p.s.i. gauge) |
| --- | --- | --- |
| 500 | 25 | 20 |
| 480 | 40 | 50 |
| 450 | 80 | 100 |
| 425 | 120 | 150 |
| 400 | 150 | 200 |

The following table is for the same torch, but with helium gas and a plate-nozzle distance of ⅛ inch:

| Current (Amperes) | Voltage (Volts) | Pressure at the Gas Inlet Opening, Such as Opening 136 in Figure 4 (p.s.i. gauge) |
| --- | --- | --- |
| 500 | 50 | 20 |
| 450 | 120 | 50 |
| 400 | 190 | 100 |
| 380 | 200 | 150 |

These tables illustrate not only the high currents in comparison to the voltages, but also the great effect gas pressure has upon the currents and voltages, it being pointed out that an increase in the gas pressure is accompanied by a decrease in current and an increase in voltage.

Figure 10:
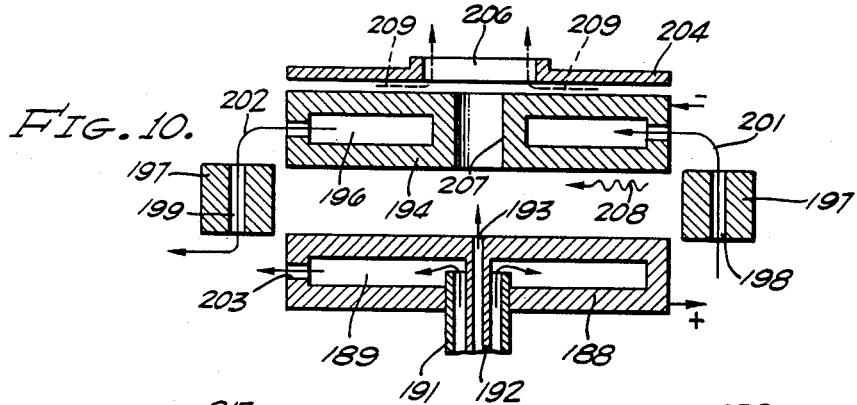
Figure 10 is a schematic view which is generally similar to Figure 9, but which illustrates the provision of additional gas flow means in order to aid in protection of the work from oxidation, and in order to permit introduction of substances into the plasma stream at a point outside the arc chamber.

Additional theory and methods relative to the plasma jet torch (Figures 8, 9, and 10)

The length of the plasma jet, and certain other characteristics thereof, may be controlled by regulating the quantity of gas introduced tangentially into the arc chamber through inlet 136 (Figure 4), for example. Thus, where the rate of tangential gas flow is high there is a relatively great electrical insulating effect in the arc chamber and around the nozzle opening, and a relatively great choking effect. This results in a lower-current arc, for a given electrical power input, than in cases where the tangential gas flow is in lesser quantity. It is primarily for this purpose that the gas flow and electrical input are both passed though the control 39 indicated in Figure 1, which control operates to regulate and stabilize both electricity and gas flow to produce the type and size of plasma jet which is desired.

To amplify upon the preceding paragraph, let it be assumed that the initial gas flow rate is relatively low, that the initial current is 200 amps., and that the initial voltage is 30 volts. Because of the relatively low gas flow rate, the gas or arc passage (vortex) diameter will be relatively large, and the plasma jet will be relatively short and fat. When the gas flow rate is increased, the vortex diameter is lessened to further constrict the arc and make the plasma jet longer and thinner. Because of this choking action, the voltage value necessary to produce the 200 amp. current will increase to 100 volts, for example. Much more electrical power is therefore required, to produce a given current value, when the gas flow rate is high than when the gas flow rate is low. However, the additional constriction of the arc increases the current density, and thus the temperature of the arc and plasma.

It has been found that the location of the tangenital gas inlet 172 (Figure 8), and the electrical potential of the gas when introduced through such inlet, are of importance. The gas which flows through the inlet 172 tends, for reasons unknown to applicant, to result in an electrical discharge therearound unless the electrical potential of the gas, and the gas inlet location, are properly selected as will next be described. Such an electrical discharge may produce burning of the insulation, loss of power, and pitting or erosion of the electrodes.

It has been discovered that the incoming gas passage 171 should be through a good electrical conductor which is electrically associated with the nozzle 152 and is at the same electrical potential, such as ring 169 in Figure 8. Also, the gas inlet 172 should be located closely adjacent the under surface of nozzle 152, that is to say the upper wall of chamber 168.

With relation to the reasons why the relationships described in the preceding paragraph minimize or eliminate undesired electrical discharge within the torch, it should be understood that the electrical potential of the plasma jet 173 at the lower end of opening 174 is substantially the same as that of the nozzle. Accordingly, since the incoming gas is also at the potential of the nozzle, there is little or no potential difference between the gas inlet and the plasma jet at the nozzle, and little or no electrical discharge therebetween. The potential of the plasma jet becomes nearer to that of the plate as the plate is approached. However, portions of the plasma jet nearer the plate are farther from the gas inlet opening 172, and this increased distance compensates for the increased potential difference to maintain electrical discharge at a minimum. There is also minimum electrical discharge between the inlet 172 and plate 167, since the inlet is located as far as possible from the plate. The problem of undesired electrical discharge through the gas in chamber 168 has not been found to be serious except in the region of the inlet 172.

Referring now to Figure 9, the nozzle is constructed substantially the same as in Figures 7 and 8, and has been given the same reference numerals. The plate is indicated at 177, and has an axial water inlet 178 to the water chamber 179, and a downwardly extending outlet 181 therefrom. A casing or jacket for the electrodes is schematically indicated at 182, and has water passages 183 therethrough. Such water passages may communicate with water chambers in the casing, such as those indicated at 63 and 64 in Figure 2. A tangential gas inlet passage 184 is shown as extending through the casing or jacket, and corresponds to the passage 134 shown in Figure 4.

A hose 185, formed of electrically insulating material and corresponding to the hoses 62 and 131 previously described, is connected from outlet 181 to a water passage 183 in jacket 182, and thus to the water chamber within the jacket. The water then flows through a tube 186 to water chamber 154 in the nozzle, and thence through an outlet passage 187 to a drain or to the water source 51.

The insulating hose 185 provides a relatively long electrically insulating path between the plate and nozzle, so that the amount of current flow through the water between the plate and nozzle is extremely small. If there were a direct, parallel water connection between plate and nozzle, a substantial amount of current would flow therethrough, resulting in power losses and also in electrolysis. Such electrolysis may result in the generation of hydrogen, and consequent danger of explosion. These defects may also be eliminated by providing two completely separate water circuits from the water source to the nozzle and plate, but this necessitates the use of four separate water hoses and results in inconvenience and expense.

The described water circuit results in cooling not only of the nozzle and plate, but also of the jacket 182 and thus the periphery of the torch. This is important since the temperatures generated in the plasma jet are so high that the torch periphery might become so hot as to be unmanageable if no water cooling means were employed.

Because of the extremely high temperatures generated in the arc and plasma jet, the problem of water sealing is acute. It has been found that if water leaks into the nozzle opening the arc will be extinguished. However, seals such as O-rings should not be placed close to the nozzle opening, or to the center of the plate, since they would immediately burn or boil. It follows that the seals should be spaced a substantial distance from the plasma jet, with water cooling elements interposed therebetween as shown in Figure 2, for example. Not only should the seals be spaced from the jet, but conventional electrical insulating elements should also be so spaced. Thus, the inner diameters of insulating elements 27 and 108 (Figures 2 and 3) are made relatively large in order that such elements will be spaced from the base of the plasma jet. A synthetic such as "Teflon" (tetrafluoroethylene) has been found to be a suitable electrical insulator, but other insulators (such as ceramics) may be employed.

It is emphasized that the water, or other coolant, should be brought close to the nozzle opening and to the center (arcing portion) of the plate, to prevent burning of the electrodes and to minimize deterioration thereof. No heat-insulating elements should be interposed between the water chambers and the arcing portions of the electrodes. The temperature gradients, where the electrodes are water cooled as indicated, are very steep and may be thousands of degrees per millimeter.

The coolant is not necessarily water, although water is most satisfactory in a majority of situations. In some situations it is desirable to use gas, instead of water, as the cooling medium in chambers 154 and 179. As previously indicated, the whirling gas in the described torches cooperates with the water in producing cooling effects.

Referring next to Figure 10, the plate is schematically represented at 188 and has a water chamber 189 therein. Water is introduced axially into chamber 189 through a large diameter pipe 191, and an auxiliary substance may be introduced through a pipe 192 which extends axially of pipe 191 and terminates in an opening 193 in the center of the plate. The nozzle is represented at 194 as having a water chamber 196, and the casing or jacket is represented at 197 as having water passages or chambers 198 and 199 therethrough. A first water circuit is indicated as being through one water passage 198 in casing 197, thence (as shown by arrow 201) into the water chamber 196 in the nozzle, thence (as shown by arrow 202) through another water passage 199 in the casing, and thence to the drain. The water circuit in the plate is from inlet pipe 191 into the water chamber 189, and thence radially through outlet 203 and to the drain. The plate and nozzle water circuits may, if desired, be associated with each other as described above.

A cap is designated by the number 204, and may correspond to the cap 7 shown in Figure 2. An opening 206 is provided in the cap above the nozzle opening 207, being of substantially larger diameter than the nozzle opening which, in turn, is normally of larger diameter than the auxiliary inlet 193. These three openings are coaxial, as are the electrodes.

A tangential gas inlet flow is indicated by the arrow 208, being the same as that effected through passage 134 and inlet 136 shown in Figure 4. Gas flow between cap 204 and nozzle 194 is indicated by the arrows 209 and is the same as that effected through passage 73 and inlet 76 shown in Figure 2A. Such gas flow between cap 204 and the nozzle may, however, be radial or axial instead of vortical in certain instances. In contrast to the showing of Figures 2 and 2B, the gas flows 208 and 209 are independent of each other, and may be from different sources.

The gas indicated by arrows 209 is inert or oxidation-preventing, and has the beneficial effect of shielding the work from oxidation. Such action produced by the gas flow 209 augments, in a co-operative action, the action of inert (or oxidation-preventing) gas 208 which flows upwardly through nozzle opening 207. In this connection it is pointed out that an excessive amount of gas (indicated at 208) should not be introduced into the gas or nozzle chamber, for flow out the nozzle opening 207, since the insulation effect produced by the gas might then be so high as to prevent striking of the arc at the upper portion of the nozzle, as indicated at 176 in Figure 8. Also, an excessive gas flow might result in reduction of the diameter of the arc passage or vortex to such an extent that the arc is choked off. On the other hand, the gas flow 208 should be sufficiently great to provide the described arc-constriction action, and the various other beneficial effects stated above.

It is pointed out that the whirling of the gas indicated at 209, and the large diameter of opening 206, maintain such gas away from the arcing region of the nozzle. This permits the arc to be struck and maintained at points such as are indicated at 176 in Figure 8.

In addition to permitting addition of noble gas for work-protection purposes, the cap 204 permits introduction of substances into the plasma jet outside the arc chamber and passage, yet at a location such that the substances so introduced remain in the jet for the maximum period of time. The substances, such as powdered metal, ceramic, ore, etc. are introduced by mixing them with the gas indicated at 209.

*Constructions of the arcing regions of the nozzle and plate (Figures 11–19)*

Referring next to Figures 11–19, the nozzle electrode is, in each instance, schematically indicated at 211 and the plate electrode at 212. In Figure 11, a simple cylindrical nozzle opening 213 is illustrated and is of the type shown in the majority of the figures previously described.

Figure 12 illustrates a nozzle opening having a narrow or constricted part adjacent the plate and a relatively large diameter part remote from the plate. More particularly, the constriction is shown at 214 as having a generally convex wall, which merges through a smooth curve with a larger diameter, generally concave wall portion 216. Portion 216 merges, remote from the plate, with a generally cylindrical wall portion 217. It is to be understood that the wall of the nozzle opening is, in each instance described herein, a surface of revolution about the axis of the torch.

In the construction shown in Figure 12, the whirling gas which abuts the under surface 218 of the nozzle flows upwardly around the wall of constriction 214 in a smooth continuous flow. This provides the above-mentioned action which prevents (under proper conditions) striking of an arc either from surface 218 or from the wall of constriction 214. The whirling gas flowing upwardly around the wall of constriction 214 fans outwardly into concave portion 216 and becomes relatively diffused. It follows that the arc will strike between concave portion 216 and the plate, so that the pitting necessarily incident to arcing (especially when no refractory metal is employed) will be substantially confined to portion 216 and will not be present at constriction 214. The diameter of the constriction will therefore remain constant, and the gas flow therearound will be smooth and free of turbulence as is highly desirable for continuous and practical operation of the torch.

Figure 13:
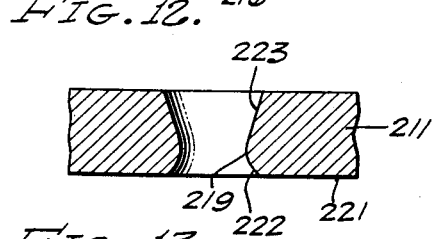

Figure 13 illustrates a nozzle opening in which the constriction 219 is spaced above the lower nozzle surface 221 (the surface closest to the plate). The portion 222 of the opening, below construction 219, is short and diverges downwardly in a relatively steep manner. By contrast, the portion 223 above the constriction is longer, and more gradual in divergence angle. This construction, which is known as a Laval nozzle, is particularly adapted for higher gas flow velocities. Gas in the nozzle chamber will flow, in a smooth and continuous manner, upwardly through portion 222 and past constriction 219. The constriction wall is thus protected from pitting and erosion, as in the wall of portion 222, but the wall portion 223 above the constriction is not so protected since the diffusing gas does not provide sufficient electrical insulation to prevent striking of the arc. Thus, the arc is struck between the plate and the wall of portion 223, as is desirable in order to maintain the constriction diameter constant, and insure that the plasma jet passes through the nozzle opening. In some cases the arc may pass all the way through the nozzle opening, and strike on the upper surface of the nozzle.

Figure 14:
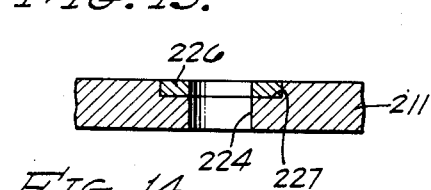

Figure 14 illustrates a cylindrical opening 224 which is partially defined by a ring 226 of electrically conductive refractory substance, the ring being inset in an annular channel 227 at the upper end of the opening (remote from the plate). The refractory ring 226 is preferably composed of a metal such as tungsten, tantalum, cadmium, and the like. The metal 226 is preferably in intimate contact with the base metal in order that the heat and electrical conductivity will be at a maximum, it having been found that application of the refractory metal by casting or plating is preferred. Because of its refractory characteristics, the metal 226 minimizes the oxidation and pitting caused when the arc is struck between it and the plate as previously indicated, thus prolonging the life of the nozzle.

Thoriated tungsten is desirable to employ as the refractory substance on the negative electrode (cathode). This is because the resultant increase in electron emission from the cathode produces desirable effects, such as in stabilizing the arc.

Figure 15:
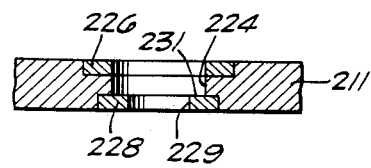

Figure 15 shows a construction which is the same as Figure 14 except that an additional ring 228 of refractory metal is inset at the lower end of nozzle opening 224, in such manner that it extends radially inwardly to provide a relatively small diameter opening 229 and a shoulder 231 thereabove. The gas in the nozzle chamber thus flows upwardly through opening 229, which comprises the constriction, and diffuses around shoulder 231. It follows that an arc will be struck between shoulder 231 and plate. However, it has been found that additional arcing may occur between the upper portion of the nozzle and the plate, the effects of such arcing being minimized due to the presence of refractory metal 226.

Figure 16:
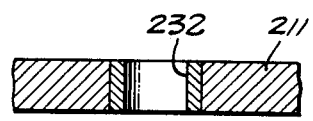

Figure 16 illustrates a construction in which the entire nozzle opening wall is protected by providing a short cylinder 232 formed of the refractory metal. Cylinder 232 is closely mounted in a cylindrical opening in the base metal of the nozzle, for example by casting.

Figure 17:

Figure 17 illustrates a construction which is generally the same as that shown in Figure 13, except that refractory metal 233 is provided over the base metal at the wall of the nozzle opening. The function of this embodiment is the same as was described with relation to the embodiment shown in Figure 13, except that the life of the nozzle is prolonged. The nozzle opening construction shown in Figure 17 is the same as that illustrated in Figure 2.

It is pointed out that the nozzle life may also be prolonged through use of an insert such as the one described in connection with Figure 3. Such an insert may be formed of inexpensive metal such as copper, being extremely economical and easily replaced. When the insert is positioned in its nozzle opening (number 119 in Figure 3), it is preferably a loose fit. This is because the insert expands greatly when heated, as compared to the water-cooled nozzle body, and is thus caused to be (even though initially loose) in intimate heat conducting and electricity conducting contact with the nozzle body during operation of the torch. It has been found that in situations where a cold insert is sufficiently large to be in close contact with the nozzle body, it expands so much during operation of the torch that the opening 119 in the body is enlarged. Such enlargement is sufficiently great that the insert will be freely removable from the nozzle opening 119 after the torch is cooled, even in situations where a pressing operation was initially required to introduce the cold insert into the opening.

Figure 18:
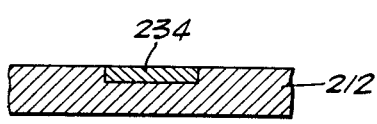
Figure 19:
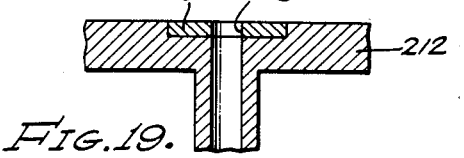

Figures 18 and 19 illustrate the use of refractory metal in connection with the plate 212. In Figure 18, the metal is indicated at 234 as inset in a plate which does not have a hole for introduction of auxiliary substance. Figure 19, on the other hand, shows the refractory metal 236 (corresponding to the metal indicated at 31 and 107 in Figures 2 and 3, respectively) as inset around the opening 238 through which the auxiliary substance is introduced.

*Additional embodiments, particularly relating to nozzle and plate constructions (Figures 20–24)*

Referring next to Figures 20–24, there are schematically illustrated various additional embodiments of the nozzle, plate and related torch components.

Figure 20:
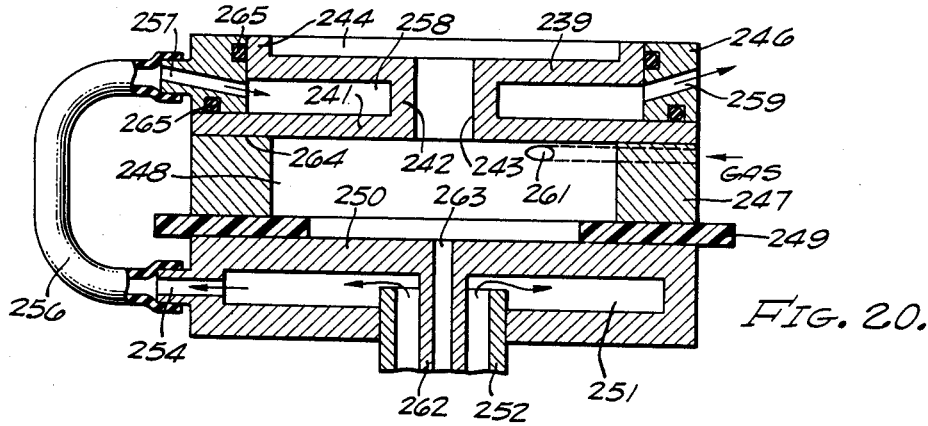
Figure 20 is a schematic longitudinal central sectional view illustrating a preferred form of interchangeable nozzle electrode.

Figure 20 illustrates a construction in which the nozzle comprises upper and lower spaced parallel discs 239 and 241, respectively. The discs are integrally connected at their open centers by a short hollow cylinder 242, so that a cylindrical nozzle opening 243 is formed. Upper disc 239 (the disc remote from the plate) has a smaller diameter than the lower disc, and is formed with an upwardly extending peripheral flange 244 the cylindrical outer side wall of which seats against the inner cylindrical surface of a clamping ring 246. The lower surface of the clamping ring seats on the outer portion of lower disc 241, being adapted to press the latter against a current connector ring 247 which defines the nozzle or gas chamber 248. Current connector 247 seats, in turn, on an insulating gasket 249 which rests on the upper surface of plate 250, the latter being of the previously described type having a water chamber 251 therein.

The nozzle, the clamping ring 246 and the current connector ring 247 are all formed of a highly conductive metal such as copper, and are held in assembled condition by a suitable cap or casing element, not shown. For example, all of the described elements may be held assembled by a cap of the general type indicated at 7 on Figure 2. Current connection is made to the connector ring 247 at a point, not shown, from which current flows upwardly into disc 241 and thence radially inwardly to the nozzle opening. Current also flows through the clamping ring 246 into upper disc 239, and then to the nozzle opening. An alternate or additional current connection may, if desired, be made to ring 246 from the current source.

The water circuit is from a water inlet pipe 252 to water chamber 251, thence radially through outlet 254 to hose 256, thence through a passage 257 in ring 246 to a water chamber 258 defined between the upper and lower discs, and thence out a passage 259 to a suitable drain. A tangential gas inlet to gas or nozzle chamber 248 is indicated at 261, and auxiliary substance may be admitted through a conduit 262 terminating at an opening 263 in the plate.

Advantages of the construction of Figure 20 are that the nozzle is relatively inexpensive to manufacture and replace, and has good electrical contact with ring 247 along large area interfaces 264 in which there need be no seals. O-ring seals 265 are, however, provided in the surfaces of clamping ring 246 which abut the nozzle element.

Figure 21:
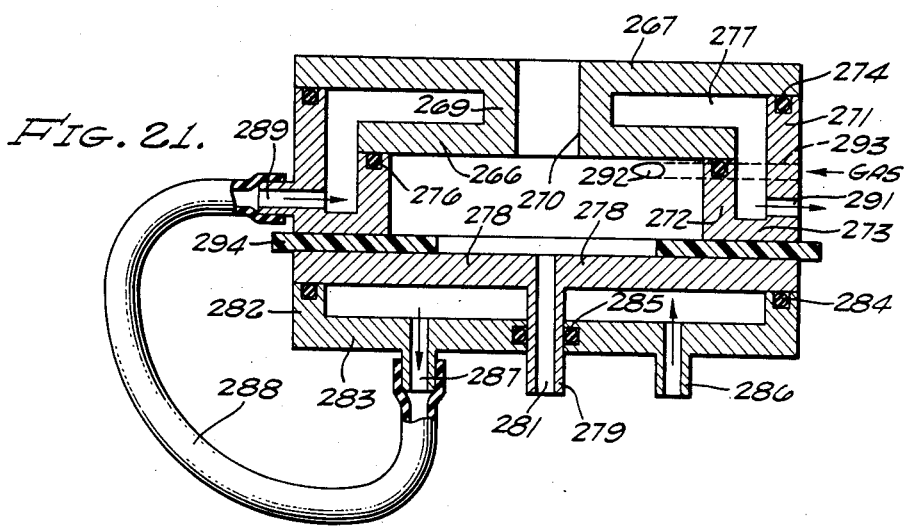
Figure 21 is a schematic longitudinal central sectional view illustrating an interchangeable nozzle electrode and an interchangeable plate electrode.

Figure 21 shows a nozzle construction which is somewhat similar to that shown in Figure 2, but is much cheaper to replace or interchange when necessary. Spaced parallel nozzle discs 266 and 267 are again provided, but in this instance the larger diameter disc 267 is uppermost. Discs 266 and 267 are integrally associated by a short hollow cylinder 269, so that a cylindrical nozzle opening 270 is formed. The peripheral portions of the discs 267 and 266 rest, respectively, on the upper ends or rims of concentric walls or cylinders 271 and 272 which are radially spaced and connected at their bottoms by a radial wall 273. O-rings 274 and 276 are provided in the upper ends of the walls 271 and 272, respectively, in order to prevent leakage of water from the water chamber 277.

The plate 278 comprises a single disc of metal having a downwardly extending stem 279, the latter being provided with an axial passage 281 for introduction of auxiliary substance. The peripheral portion of plate 278 rests upon the rim 282 of a cup 283, and the stem 279 is inserted through a central opening in the bottom wall of the cup. O-rings 284 and 285 are provided, respectively, around the rim 282 and around the opening in the cup bottom wall in order to prevent leakage of water from the cup. With the described construction of plate 278, the cost of manufacturing and replacing the same is minimized.

The water circuit comprises an inlet 286 in the bottom wall of cup 283, and located midway between the center of the cup and the rim 282 thereof. A water outlet 287 is correspondingly placed but in the opposite portion of the cup, being connected through an insulating tube 288 to an inlet 289 in cylinder 271. Water is thus introduced into the water chamber 277, after which it is discharged through an outlet 291 in the diametrically opposite portion of wall 271.

Gas is introduced through a tangential inlet 292 in cylinder 272 from suitable tangential passage and pipe means indicated at 293. An insulating gasket 294 is provided between plate 278 and the radial wall 273, so that there will be no leakage to the plate of current which is supplied to the outer wall 271 at a point, not shown. Such current flows through both cylinders 271 and 272 to the peripheral portions of discs 267 and 266, and thence to the region of the nozzle opening 270. Current connection to the plate is made by connecting a lead to the cup 283, from which the current flows through rim 282 to the peripheral portion of plate 278 and thence to the center thereof. A certain amount of current also flows through stem 279. All of the torch components are held in assembled relation by suitable means, not shown.

Figure 22:
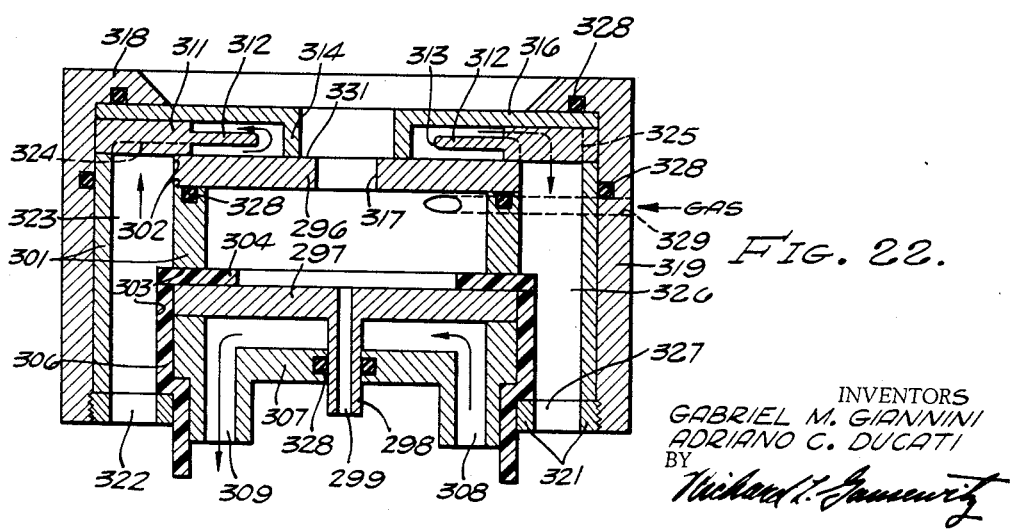
Figure 22 is a schematic longitudinal central sectional view illustrating another form of interchangeable electrode, characterized by centrifugal or vortical fluid cooling of the nozzle.

Figure 22 illustrates a construction in which the nozzle 296 is a mere disc of copper or other suitable metal, and is thus extremely economical to manufacture and replace. The plate may also be a mere disc 297, or may be provided with a stem 298 and passage 299 if it is desired to introduce an auxiliary substance into the plasma.

The main elements of the torch include a body 301 which is formed as a hollow metal cylinder having an annular recess or channel 302 at its upper central portion in order to seat the periphery of nozzle disc 296. A much larger annular recess or counterbore 303 is provided in the lower portion of body 301 in order to receive an insulating gasket 304. The outer portion of gasket 304 seats over a generally cylindrical hollow insulating element 306, the arrangement corresponding roughly to that described in connection with Figure 3. Insulating element 306 surrounds the plate disc 297 and also a conductive cup 307 disposed therebeneath. The cup construction is similar to that described in connection with Figure 21, there being a central opening in the cup bottom to receive stem 298, and inlet and outlet water passages 308 and 309 to permit flow of water through the cup chamber.

The means for cooling the nozzle 296 is an important feature of the embodiment shown in Figure 22, and comprises a water or nozzle ring 311 having a solid outer or body portion which seats over the upper end of body 301 and also over the peripheral portion of nozzle disc 296. A relatively thin inwardly extending flange 312 is formed integral with the solid outer portion of the ring, and terminates at its innermost edge 313 in a circle spaced radially outwardly from a tubular stem portion 314 of a cap disc 316. The lower end of such tubular stem portion 314 seats on the upper surface of nozzle disc 296 around a circle which is spaced outwardly from the nozzle opening 317. A peripheral portion of the cap disc 316 seats over the body portion of water or nozzle ring 311, being held in position by the flange 318 of a casing cylinder or tube 319. The casing cylinder, in turn, extends downwardly around body 301 and is held in position by a clamping ring 321 which is internally threaded therein. The inner portion of the clamping ring seats under a shoulder in insulating element 306 to maintain the cup 307, etc., in position.

Water from a suitable source flows upwardly through an opening 322 in the clamping ring into a vertical passage 323 in body 301. The upper end of the passage 323 communicates with a passage or channel, indicated at 324, in the under surface of the outer portion of water ring 311. The passage or channel 324 communicates tangentially with the annular chamber or channel which lies between flange 312 and the nozzle, so that water flowing through the tangential passage enters below the flange 312 in a whirling or vortical action. As soon as such water reaches the inner edge portion 313 of flange 312 it moves upwardly and then, because of the loss in pressure and because of the continued centrifugal or whirling action, flows radially outwardly through the annular chamber or channel which lies above flange 312. A passage, indicated at 325 and preferably tangential, is provided through the body of ring 311 and serves to conduct water from the annular chamber above flange 312 to a second longitudinal passage 326 in body 301. The passage 326 communicates through a port 327 in clamping ring 321 with a suitable drain. O-rings 328 are provided to effect the water seals, and a tangential gas inlet to the nozzle or gas chamber is provided at 329.

The arc is struck between plate 297, around the upper end of passage 299, and the upper surface of nozzle 296 around opening 317, as indicated at 331. The arcing portion 331 thus becomes very hot, but is effectively cooled by the water in the annular chamber surrounding stem portion 314. Because of the described whirling action in such annular chamber, the coolant water does not flow beneath the tube 314 and extinguish the arc, as would occur if there were no such whirling action and no O-ring or other seal at the end of stem 314. As previously indicated, it is impractical or impossible to locate a seal at such point because the temperature of the plasma jet is such that an O-ring or other conventional seal would boil or burn.

Referring next to Figure 23, a construction is shown in which water cooling is provided in the absence of a solid wall between the water and the plasma. Instead, the water itself forms the cylindrical side wall of the chamber in which the whirling gas is confined. In this embodiment the nozzle is illustrated as a disc 332 having a cylindrical nozzle opening 333 therein, the opening being surrounded by a short hollow cylinder 334 of refractory metal. The plate comprises a disc 336 having a downwardly extending axial stem 337 through which a passage 338 is formed for transmission of auxiliary substance, there being a refractory ring 339 inset around the upper end of the passage. An overhanging disc-shaped lip 341 is spaced above plate disc 336 and parallel thereto. The annular chamber between lip 341 and the plate disc 336 communicates with radial passages 342 formed in the plate. An insulating ring 343 is mounted between lip 341 and the under side of nozzle disc 332. Suitable means (not shown) are employed to maintain the elements in assembled condition.

Lip 341 has a round central opening 344 the diameter of which is substantially larger than that of nozzle opening 333. The diameter of opening 344 is also slightly greater than that of an annular recess or channel 346 provided in the under side of nozzle disc 332 around opening 333. The inner cylindrical wall of insulating ring 343 has a diameter substantially larger than the diameter of opening 344, it being understood that all of these openings and walls are co-axial. This construction results in the formation of a water chamber 347 defined by the inner surface of insulating ring 343, the under surface of nozzle 332 outwardly of channel 346, and the upper surface of lip 341. Water is introduced into such chamber through a passage 348 which is tangential thereto and terminates in a tangential inlet opening 349. Gas is introduced into the torch through a tangential gas passage 351 terminating in an inlet 352 in the cylindrical side wall of recess or channel 346.

With the described construction, the whirling water in annular chamber 347 flows outwardly through the largest hole, which is the round opening 344 in lip 341, and is discharged radially through passages 342. A cylindrical wall of water is thus formed, being indicated at 353, and this wall 353 forms the cylindrical side wall of a gas chamber into which gas is introduced through passage 351 and inlet 352. Such gas flows upwardly through nozzle opening 333 to provide the protective and other effects previously described. A certain amount of the gas also flows out with the water, but the quantity of gas introduced is sufficient to insure that gas will flow through the nozzle opening. This arrangement produces cooling of both nozzle and plate with a construction in which relatively few seals are required.

Figure 24 illustrates a construction in which a solid wall, shown as a short hollow metal cylinder or tube 354, is interposed between the gas and water. In this embodiment the nozzle comprises a disc 355 having a nozzle opening 356 protected by refractory metal 357. The plate 358 comprises a disc having a stem 359, auxiliary substance passage 361, and refractory ring 362. An undercut annular channel 363 is formed in the upper portion of plate disc 358 so that an overhanging lip 364 is formed, such channel terminating at its periphery in water outlet passages 366.

The wall 354 seats on an insulating gasket 367, and is concentric with a larger diameter wall or cylinder 368 formed of insulating material. Cylinders 354 and 368 are radially spaced to form an annular water chamber 369 above the channel 363.

Gas is introduced through tangential inlet means 371, and spirals in the nozzle chamber for discharge through the nozzle opening 356 as previously described. Water is introduced into water chamber 369 through an inlet 372, such inlet being preferably tangential to the chamber in order to minimize the necessity for providing sealing elements.

*Methods of performing useful functions with the plasma jet apparatus (Figures 25–32)*

Referring first to Figure 25, there is illustrated a method of ceramic coating or metalizing a workpiece 376 which may be formed of metal. The workpiece may also be a non-metal and electrically non-conductive, since it is not connected in the electric circuit. Various ones of the above-described torches (constructed and operated in accordance with the present invention) may be employed in carrying out the method, the illustrated torch being schematically represented as comprising a nozzle 377 and plate 378 separated by an insulator 379. Water cooling means, not shown, are provided. Gas is introduced into the nozzle through a tangential passage 381 terminating in an inlet 382, and serves to constrict the arc as stated above. According to the present method, a powder, such as a ceramic or metal powder, is mixed with the gas flowing through passage 381. Such powder passes with the gas upwardly through the nozzle opening 383 and is carried by the plasma jet 384 into contact with the surface of the workpiece 376, where it solidifies and forms a coating 386. Suitable substances may also be mixed with the water in a device such as is illustrated in Figure 23, since evaporation of the substance in the water results in the depositing of such substance on the workpiece.

Referring next to Figure 26, the torch and workpiece are the same as described in connection with Figure 25, and have been given the same reference numerals, except that in this instance a passage 387 is provided axially of the plate and terminates in a central opening therein. The powder, normally ceramic or metal powder, is introduced through the passage 387 and enters the base of plasma jet 384. The powder is thus carried along by the plasma jet and is deposited on the work 376, as in the case of the embodiment shown in Figure 25. The gas introduced through tangential passage 381 may be a pure inert gas, or powder may be mixed with the gas. In the latter case the powder is introduced both tangentially and axially. The substance may also be introduced in stick or rod form through passage 387.

It is pointed out that the method illustrated in Figure 26 may also be employed in the fractional distillation (refining or purifying) of ore. Thus, ground ore, for example titanium ore, is introduced continuously through passage 387 into the jet 384. The torch conditions are then carefully controlled so that the jet has a predetermined temperature adapted to effect selective vaporization of the ore to produce the desired fractional distillation effect. The material thus vaporized is then selectively condensed to produce the metal, or compounds thereof, of extremely high purity. The described method is greatly superior to methods employing mere electric arcs, for example methods in which the ore is made part of an electrode, since it is not necessary to prepare the ore other than by grinding the same. Also, the present torch produces a stable jet the temperature of which may be precisely controlled, which is to be contrasted with mere arc devices in which arc blow and other factors produce substantial variations in temperature.

The methods of Figures 25 and 26 may be advantageously performed by introducing the auxiliary substance at a point outside the torch, as was described with relation to cap 204 shown in Figure 10. Also, the coating substance may be obtained from a consumable back electrode.

Figure 27 illustrates another method of metalizing or ceramic-coating a metal or non-metal workpiece, indicated at 388. In this embodiment the plasma torch is indicated at 389, and is representative of any of the torches (constructed and operated in accordance with the present invention) previously described. A stick or wire 391 of metal, ceramic, or other substance to be coated onto the work 388 is suitably mounted externally of the torch and is fed against the work at the upper end of the plasma jet 392. The end of the stick or wire is thus instantaneously melted, and adheres to the workpiece as desired.

Referring to Figure 28, the method is the same as that taught with reference to Figure 27, except that the externally applied metal or ceramic is in powder form. The powder is disposed in a suitable container 393 and is blown through a hose or pipe 394 by a suitable gas, preferably an inert gas such as argon, introduced at 396. The powder is thus blown against the work adjacent the end of the plasma jet, being again instantaneously melted and coated onto the work.

Proceeding next to Figure 29, a workpiece formed of metal or non-metal is indicated at 397, and is mounted in a lathe represented schematically at 398. A torch, again indicated at 389 as representative of the previously described torches (constructed and operated in accordance with the present invention), is so positioned that the end of the plasma jet 392 impinges against the rotating workpiece. The temperature, rotation speed and other factors are so selected that the portion of the workpiece engaged by the plasma jet is immediately melted, the result being that the plasma jet acts as a cutting tool to effect shaping of the workpiece. This is to be contrasted with prior art methods, in which the heating devices merely caused softening of the workpiece, and not instantaneous local melting thereof. It is pointed out that melting of the workpiece is not normally effected in the above-described ceramic coating or metalizing operations. This is because such factors as the speed of the torch relative to the work, the spacing between the torch and the work, etc., are regulated to prevent melting.

It is to be understood that the preceding paragraph also applies to milling and other processes wherein there is relative movement between the torch and the work.

Referring to Figure 30, a plate or workpiece 399, which may be a metal such as steel or tungsten carbide, or may be a non-metal such as fire brick, ceramic or cement, is illustrated as being cut or penetrated (drilled) by the jet 392 from the representative torch 389. The very high-temperature plasma jet is thus employed as a drill to form a hole, which may be a very small hole, or as a cutting element to effect cutting of the workpiece into sections. The cutting or drilling action is effected without the necessity of connecting the work in the electric circuit, which greatly facilitates the operation and permits cutting from both sides of the work if desired. Cutting or drilling from both sides of workpiece 399 is shown in Figure 30A. The cutting or drilling action (and also shaping operations) occurs so fast that the metal or other substance spaced away from the plasma jet is not adversely affected by the heat, there being insufficient time for excessive heat conduction thereto.

Such cutting, drilling and shaping operations, etc., may be facilitated by introducing a gas such as hydrogen into the plasma jet, to produce a reaction whereby the hydrogen becomes atomic and increases the heat of the jet. Other substances may also be introduced into the jet, as desired. The workpiece may, if desired, be protected by inert gas such as is introduced through the cap 7 shown in Figure 2, or cap 204 shown in Figure 10. Under other conditions oxygen may be introduced through cap 204 (Figure 10) to provide an oxidizing effect on the workpiece. In the latter connection it is emphasized that oxygen should not normally be employed as the arc-constriction gas, because of electrode deterioration.

Figure 31 illustrates the use of the present plasma torch in welding two plates or sheets 401 and 402 which, again, may be either metal or non-metal and need not be electrically conductive since the work is not in the electric circuit. The torch (constructed and operated in accordance with the present invention) is represented at 403 and preferably, although not necessarily, comprises a torch (such as the one described with reference to Figures 2 and 10) in which an inert gas is introduced in substantial quantities around the plasma jet in order to aid in protecting the work from oxidation. Filler metal may be introduced into the weld in the form of a stick or a wire 404, which stick or wire is also representative of ceramic or other substances in cases where the work is a non-metal.

Figure 32 represents a number of other methods or processes in which the very high-temperature plasma torch 389 is highly effective and useful, particularly because of the very high temperatures produced. In the first place, the torch may be employed to effect localized heating and hardening of the workpiece 406, especially in situations where the workpiece is metal. Such metal is heated so quickly that, as above indicated, surrounding portions of the metal are not undesirably heated.

The work 406 may also be a non-metal such as ceramic, cement, etc. In connection with such non-metal, but also in connection with metals, the torch is particularly useful in eliminating surface porosity since the surface melts and forms a smooth layer over the porous interior.

Thus, the plasma torch is highly effective in the surface treating of both metals and non-metals for various purposes. The torch is also effective in sintering, again because of the extremely rapid heating which may, if desired, be of a local nature. Thus, a metal sheet 406a, having a lower melting point than sheet 406 (assuming that sheet 406 is metal), may be sintered to sheet 406 without becoming melted.

It is pointed out that the present torch is also an excellent source of light, since the plasma jet radiates intensely. For example, a smaller torch of the present type produces a very excellent point source of light which is useful in certain optical applications, such as spectroscopy.

It has been found that in order to achieve proper whirling flow of gas, and arc constriction, the gas should flow through a tangential passage such as passage 134 in Figure 4. Additional tangential passages may be provided, however, both longitudinally and circumferentially of the torch. Also, it has been found advantageous to pass the gas through a tangential slit extending longitudinally of the torch for substantially the full length of the arc chamber (such as chamber 168 in Figure 8). It has been found to be relatively unsatisfactory to cause the gas to whirl in an auxiliary chamber (not the arc chamber) and then pass such whirling gas into the arc chamber, this being primarily because good vortex definition and arc constriction are difficult or impossible to achieve.

The theory stated in this specification is based upon extensive experimentation and testing, and represents the best present understanding of the inventors as to what actually happens in the torch. It is to be understood, however, that much of the theory is extremely difficult to verify, and that the appended claims are not to be limited as to theory except insofar as is required by the prior art.

Various embodiments of the present invention, in addition to what has been illustrated and described in detail, may be employed without departing from the scope of the accompanying claims.

We claim:

1. A plasma jet torch apparatus, which comprises a metal nozzle having a nozzle opening therein, a back electrode having an arcing portion disposed opposite said opening and spaced from said opening a distance less than four times the minimum diameter of said opening, means to define a gas pressure chamber the side wall of which is a surface of revolution about an axis through said opening, said chamber having a diameter at least two times the minimum diameter of said opening, said chamber communicating with said arcing portion and with said opening, and means to pass gas tangentially into said gas pressure chamber for vortical flow therein and subsequent expansion through said opening.

2. A high-current, low-voltage plasma jet torch apparatus, which comprises a metal nozzle having a round nozzle opening therein, a back electrode having an arcing portion coaxial with said opening and spaced from said opening, means to define a generally annular gas pressure chamber coaxial with said opening and having a diameter at least two times the minimum diameter of said opening, said chamber communicating with said arcing portion and being substantially closed at one end by said nozzle, passage means communicating tangentially with said pressure chamber, and means to pass gas through said passage means at a pressure sufficiently high that the absolute gas pressure at the peripheral part of said chamber adjacent said nozzle is at least 1.6 times the absolute ambient pressure outside said nozzle opening.

3. The invention as claimed in claim 2, in which the diameter of said nozzle opening is larger than the diameter of said passage means at the inlet to said pressure chamber, and in which said diameters are so related to each other that the gas pressure gradient near the axis of said pressure chamber is at or near maximum, within the range of normal arc-constricting gas pressures for the torch.

4. A plasma jet torch apparatus, which comprises a metal nozzle electrode having a nozzle opening therein, a back electrode having an arcing portion disposed opposite said opening and spaced from said opening, said nozzle electrode being beveled at the end portion of said opening relatively adjacent said back electrode, means to define a gas pressure chamber the side wall of which is a surface of revolution coaxial with said opening and having a diameter at least two times the minimum diameter of said opening, said pressure chamber communicating with said arcing portion and said opening, means to pass gas tangentially into said pressure chamber at a pressure sufficiently high that the absolute pressure along the peripheral part of said chamber is at least 1.6 times the absolute ambient pressure outside said nozzle opening, and means to supply negative direct voltage to said nozzle electrode and positive direct voltage to said back electrode, thereby to cause passage of a high-current, gas-constricted arc between said arcing portion and a region of said nozzle around said opening and relatively remote from said back electrode.

5. In an electric plasma stream torch, a nozzle electrode having a nozzle opening therein, means to define a gas pressure chamber substantially closed at one end by said nozzle electrode, a back electrode having an arcing portion disposed in said pressure chamber and spaced from said opening, said back electrode being electrically insulated from said nozzle electrode, means to impress a voltage across said electrodes to cause passage of an electric arc between said arcing portion and said nozzle electrode at said nozzle opening, and means to introduce gas tangentially into said chamber at such pressure that the absolute gas pressure along the peripheral part of said pressure chamber, remote from said arc, is at least 1.6 times the absolute ambient pressure on the side of said nozzle opening remote from said arcing portion.

6. The invention as claimed in claim 5, in which said arcing portion is spaced from said nozzle opening a distance between 0.3 and 2.0 times the minimum diameter of said opening, and in which the last-mentioned means includes an inlet opening having an area substantially smaller than that of said nozzle opening.

7. A method of creating and sustaining a stable, very high-temperature plasma jet, which comprises providing a metal nozzle having a nozzle opening therein, forming a gas pressure chamber on one side of said nozzle and communicating with said opening, providing a back electrode having an arcing portion disposed in said pressure chamber opposite said opening and spaced therefrom, maintaining a high-current electric arc extending at least from said arcing portion to the vicinity of said opening, and introducing a gas continuously into said pressure chamber at an absolute inlet pressure at least 1.6 times the absolute pressure on the side of said opening remote from said back electrode, said last-named step being performed in such manner as to form a wall of gas around said arc and which has a pressure much higher than the pressure at the axis of said arc whereby to effect constriction of said arc.

8. A method of creating and sustaining a stable, very high-temperature plasma jet, which comprises providing a metal nozzle electrode having a nozzle opening therein, forming an annular gas pressure chamber on one side of said nozzle electrode and communicating with said opening, providing a back electrode having an arcing portion disposed in said pressure chamber opposite said opening and spaced therefrom, introducing a gas continuously and tangentially into said pressure chamber at an absolute inlet pressure at least 1.6 times the absolute pressure at said nozzle opening outside said chamber, and impressing a negative direct voltage on said nozzle electrode and a positive direct voltage on said back electrode.

9. A method of creating and sustaining a stable, very high-temperature plasma jet, which method comprises providing a relatively flat nozzle electrode formed of a highly conductive metal and having a round nozzle opening at the center portion thereof, forming a generally annular pressure chamber on one side of said nozzle electrode coaxial with said opening and communicating therewith, providing a back electrode having an arcing portion disposed in said pressure chamber coaxial with said opening and spaced therefrom a distance less than four times the minimum diameter of said opening, said pressure chamber having a diameter at least twice the minimum diameter of said nozzle opening, and introducing an oxidation-preventing gas continuously and tangentially into said pressure chamber at an absolute inlet pressure at least 1.6 times the absolute ambient pressure.

10. A method of creating and sustaining a stable, very high-temperature plasma jet, which method comprises providing a relatively flat nozzle electrode formed of a highly conductive metal and having a round nozzle opening at the center portion thereof, forming a generally cylindrical pressure chamber on one side of said nozzle electrode and coaxial with said opening and communicating therewith, providing a back electrode having an arcing portion disposed in said pressure chamber coaxial with said opening and spaced therefrom a distance less than four times the minimum diameter of said opening, said pressure chamber having a diameter at least twice the minimum diameter of said nozzle opening, introducing an oxidation-preventing gas continuously and tangentially into said pressure chamber at an absolute inlet pressure at least 1.6 times the absolute ambient pressure and impressing a positive direct voltage on said back electrode and a negative direct voltage on said nozzle electrode to effect passage of a high-current electric arc between said arcing portion and said nozzle at regions around said opening and relatively remote from said back electrode, said arc being constricted to the vortex in said gas at the axis of said pressure chamber and being prevented from contacting said nozzle at regions relatively adjacent said back electrode.

11. A method of creating and sustaining a very high-temperature plasma jet, which comprises providing a relatively large-area metal, water-cooled nozzle electrode having a round nozzle opening in the center portion thereof, providing a relatively large-area metal, water-cooled plate electrode in generally parallel relationship to said nozzle electrode and spaced therefrom, providing a generally annular wall between said electrodes coaxial with said nozzle opening and having a diameter much larger than that of said opening, applying a positive direct voltage to said plate electrode and a negative direct voltage to said nozzle electrode in the voltage range of 20 volts to 500 volts, thereby effecting passage of an electric arc between said plate and said nozzle electrode at said nozzle opening in the current range of 20 amperes to 2,000 amperes, and introducing an inert gas tangentially into said chamber at an inlet pressure in the range of 9 p.s.i. gauge to 200 p.s.i. gauge, said gas being introduced at a velocity sufficiently high to effect a vortical flow in said chamber and subsequent expansion of said gas through said nozzle opening.

12. The invention as claimed in claim 11, in which said method includes the step of correlating the diameter of said nozzle opening to the diameter of the gas inlet opening, and in relation to the gas pressure, until the gas pressure gradient at the wall of the vortex near the axis of the torch is maximized.

13. A high-current, low-voltage plasma stream torch the working parts of which have a diameter substantially greater than the length or axial dimension thereof, which torch comprises a generally disc-shaped metal nozzle electrode having a round nozzle opening at the center thereof, the inner portion of said nozzle electrode around said opening being beveled or rounded, sadi opening having a minimum diameter in the range of 1/32" to 1", a generally disc-shaped plate electrode disposed generally parallel to said nozzle electrode and spaced therefrom a distance in the range of 1/32" to 1", means to water-cool said plate and nozzle electrodes, wall means to define an annular gas pressure chamber between said electrodes and coaxial with said nozzle opening, said gas pressure chamber having a diameter at least twice the diameter of said nozzle opening, means to introduce inert gas through a tangential gas inlet opening and into said pressure chamber at an inlet pressure in the range of 9 p.s.i. gauge to 200 p.s.i. gauge, said gas inlet having a diameter smaller than that of said nozzle opening, said gas means effecting a flow of gas at a velocity sufficiently high to create whirling or vortical action in said pressure chamber and subsequent expansion of gas through said nozzle opening, and means to impress a voltage between said nozzle and plate electrodes in the range of 20 volts to 500 volts to thereby effect current flow through said vortex between said nozzle and plate electrode and in the range of 20 amperes to 2,000 amperes.

14. The invention as claimed in claim 13, in which said last-named means includes means to impress a positive direct voltage on said plate and a negative direct voltage on said nozzle, said polarity cooperating with said gas to effect passage of all portions of a constricted arc at least part of the way through said nozzle opening, whereby deterioration of said nozzle opening is such that the constriction diameter remains fixed.

15. In a plasma stream apparatus, a nozzle electrode having an opening therein, a back electrode, means to apply a negative direct voltage to said nozzle electrode and a positive direct voltage to said back electrode to effect generation of an electric arc therebetween and consequent passing of a high-temperature plasma stream through said opening, and means to effect gas-constriction of said arc.

16. A plasma stream apparatus, which comprises a nozzle electrode having an opening therein, a back electrode having an arcing portion spaced from the region of said nozzle surrounding said opening, means to maintain a high-current, low voltage arc between said electrodes, and means to prevent maintenance of said arc between said arcing portion and the side of said nozzle adjacent said back electrode and to effect maintenance of said arc between said arcing portion and said region at points relatively remote from said back electrode whereby the terminal portions of said arc are caused to pass at least part of the way through said opening.

17. The invention as claimed in claim 16, in which said electrodes are formed of metal, and in which said last-named means includes means to pass continuously a gas between said electrodes and through said opening.

18. A plasma jet torch, which comprises a nozzle electrode having an opening therein, a base electrode spaced from said nozzle, means to define a generally annular chamber between said base and nozzle, said chamber being generally coaxial with said opening and having a diameter at least twice that of said opening, means to pass continuously a gas tangentially into said chamber at a speed sufficiently high to effect a whirling or vortical action therein, and at an absolute pressure at least 1.6 times the absolute pressure externally of the torch at said opening, the inner portion of said whirling gas defining an arc and plasma vortex or passage of low gas pressure and extending from said base through said chamber and into said opening, and means to create and maintain a high-current electric arc and plasma jet between said base and nozzle, said arc and plasma jet being constricted to said vortex by said gas to result in a high current-density arc and a very high-temperature plasma jet.

19. The invention as claimed in claim 18, in which said gas means includes an inlet located adjacent said nozzle, and in which means are provided to cause said gas when it flows through said inlet to be at the same electrical potential as said nozzle.

20. The invention as claimed in claim 18, in which the last-named means includes means to supply negative direct voltage to said nozzle and positive direct voltage to said base.

21. The invention as claimed in claim 18, in which said nozzle electrode is formed of a highly conductive metal, and in which means additional to said gas are provided to cool the same.

22. The invention as claimed in claim 18, in which said nozzle opening is round and is beveled at its inner portion, and in which said gas is an oxidation-preventing gas which serves additionally to protect said nozzle from oxidation and to protect the work from oxidation.

23. In a plasma stream apparatus, nozzle and back electrodes electrically insulated from each other, means to define a gas chamber between said electrodes and communicating therewith and with the nozzle opening in said nozzle electrode, and means to introduce a gas into said chamber and at the same electrical potential as that of one of said electrodes, said last-named means including a gas inlet disposed close to a surface of said one electrode and spaced from the other electrode.

24. The invention as claimed in claim 23, in which said one electrode is said nozzle electrode.

25. In a plasma jet device, a nozzle electrode having outer and inner surfaces which are large in relation to the distance between said surfaces at the centers thereof, said electrode having a nozzle opening therethrough at said centers, and means to supply current to the peripheral portion of said nozzle electrode for inward flow to the region of said opening.

26. The invention as claimed in claim 25, in which a relatively thin, large-area plate electrode is mounted in spaced, generally parallel and coaxial relation to said inner surface, and in which means are provided to supply current to the peripheral portion of said plate electrode.

27. A plasma jet torch, which comprises a generally disc-shaped plate electrode formed of a highly conductive metal, a generally disc-shaped nozzle electrode formed of highly conductive metal and having a round opening provided axially therethrough, said nozzle being spaced from said plate a distance less than four times the minimum diameter of said opening, means to define a cylindrical or annular chamber axially of said opening, said chamber being substantially closed at one end by said plate and at the other end by said nozzle, means to mount said nozzle and plate in coaxial, electrically insulated relationship relative to each other, means to introduce continuously a gas tangentially into said cylindrical chamber and at an absolute inlet pressure at least 1.6 times the absolute pressure outside said opening, a first water chamber formed at said nozzle around said opening, a second water chamber formed at the center portion of said plate, means to circulate water through said water chambers, and current conductor means to connect a current supply source to said nozzle and to said plate.

28. The invention as claimed in claim 27, in which means are provided to supply positive direct voltage to the current conductor means for said plate and negative direct voltage to the current conductor means for said nozzle.

29. In a plasma jet torch, a nozzle electrode formed of highly conductive metal and having a nozzle opening therein, a back electrode, means to mount said nozzle and back electrodes in spaced relationship and electrically insulated from each other, means to define a generally annular gas chamber between said nozzle and back electrodes and generally coaxial with said opening, means to introduce a gas tangentially into said chamber for vortical flow therein and subsequent vortical flow out said opening, said last-named means introducing said gas at a pressure sufficiently high to effect constriction of an arc between said nozzle and back electrode, and means additional to said gas to cool said nozzle.

30. A method of creating a very high-temperature plasma jet, which comprises providing nozzle and back electrodes, applying negative direct voltage to said nozzle electrode and positive direct voltage to said back electrode to effect maintenance of an arc between said nozzle and back electrode, and gas-constricting said arc to effect passage of a very high-temperature plasma jet through the opening in said nozzle electrode.

31. A method of maintaining a plasma jet, which comprises providing nozzle and back electrodes formed of highly conductive metal, applying a voltage between said electrodes to effect striking and maintenance of an arc therebetween, and gas-constricting said arc to effect passage of a very high-temperature plasma jet through the opening in said nozzle electrode.

32. A method of maintaining a plasma jet, which comprises providing nozzle and base electrodes, creating a continuous whirling or vortical flow of gas between said electrodes and in such relation to said nozzle that the whirling gas at the vortex passes through the nozzle opening, said gas serving to electrically insulate the surface of said nozzle adjacent said base and the region of said nozzle around said nozzle opening and relatively adjacent said base, and applying sufficient negative direct voltage to said nozzle and a positive direct voltage to said base to effect maintenance of a high-current arc therebetween, said arc being constricted to the central vortex portion of said whirling gas and being prevented by said gas from contacting said surface and said region.

33. The invention as claimed in claim 32, in which said gas is introduced in a quantity which is great enough to effect said arc-constriction effect but small enough that the nozzle region around said nozzle opening and relatively remote from said base is not sufficiently insulated to prevent striking of an electric arc therefrom to said base.

34. The invention as claimed in claim 32, in which said electrodes are formed of metal, and said method includes the step of water cooling the portion of said nozzle electrode adjacent said nozzle opening.

35. The invention as claimed in claim 32, in which said method includes causing said gas at the beginning point of its whirling or vortical path to be at the same electrical potential as that of said nozzle, and in which said beginning point is located close to said surface of said nozzle.

36. A method of creating a plasma jet, which comprises providing a back electrode, providing a nozzle having a nozzle opening therein, maintaining a high-current electric arc at least from said back electrode to the vicinity of said opening, continuously introducing a gas between said back electrode and said opening and in a manner defining a constricted low-pressure arc passage leading from said back electrode and communicating with said opening, said gas having sufficient pressure to effectively constrict said arc to said passage, and causing said gas to pass through said opening.

37. In a plasma jet apparatus, electrode means to maintain an electric arc, gas means to constrict said arc, and means to correlate and control the supply of electricity to said electrode means and the supply of gas to said gas means in a manner resulting in generation of a plasma stream having predetermined, controllable characteristics.

38. In a method of controlling a plasma stream, the steps of providing first and second electrodes, maintaining a high-current electric arc between said electrodes, introducing a gas between said electrodes and in a manner operating to variably gas-constrict said arc, and controlling said gas to vary the degree of gas-constriction of said arc.

39. A plasma jet torch apparatus, which comprises a nozzle electrode formed of highly conductive metal having a nozzle opening therein, a plate electrode formed of highly conductive metal and spaced from said nozzle, means to apply sufficient negative direct voltage to said nozzle and positive direct voltage to said plate to maintain a high-current electric arc therebetween, and means to effect continuous and rapid flow of an oxidation-preventing gas into the space between said electrodes and thence out through said opening in a manner operating to dynamically gas-constrict said arc to a path from said plate and at least partially through said opening, thereby resulting in passing of a very high-temperature plasma stream through said opening.

40. The invention as claimed in claim 39, in which said gas is an inert gas, and in which means additional to said gas means are provided to cool said electrodes.

41. A method of generating and maintaining a very high-temperature plasma jet or stream, which comprises providing nozzle and plate electrodes formed of highly conductive metal, applying sufficient negative direct voltage to said nozzle and positive direct voltage to said plate to maintain a high-current electric arc therebetween, and rapidly and continuously passing an oxidation-preventing gas between said electrodes and through said opening in a manner operating to dynamically gas-constrict said arc to a path from said plate and at least part of the way through said opening, thereby resulting in passing of a very high-temperature plasma stream through said opening.

42. The invention as claimed in claim 41, in which said method includes passing said gas vortically between said electrodes to constrict said arc to the vortex, and in which the maximum absolute pressure of said gas between said electrodes is at least 1.6 times the absolute ambient pressure on the side of said nozzle remote from said plate.

43. In a plasma jet torch, plate and nozzle electrodes formed of metal, means to apply negative direct voltage to one of said electrodes and positive direct voltage to the other of said electrodes to thus effect maintenance of an electric arc therebetween, means to gas-constrict said arc and effect passage of a plasma jet through the nozzle opening, and thoriated tungsten means provided on the arcing portion of said one electrode to increase the electron emission therefrom.

44. In an electrical plasma-jet torch apparatus having a back electrode, a relatively thin, large-area metal nozzle electrode having a nozzle opening therethrough, the edge of said nozzle electrode around said opening and relatively adjacent said back electrode being beveled.

45. A plasma-jet torch apparatus, which comprises a generally disc-shaped nozzle electrode formed of metal, said electrode having a round nozzle opening in the center portion thereof, the inner edge of said nozzle electrode at the inner end portion of said nozzle opening being rounded, a back electrode having an arcing portion spaced opposite said inner edge of said nozzle electrode at said nozzle opening and generally coaxial therewith, means to define a generally annular gas pressure chamber between said nozzle electrode and said arcing portion and coaxial therewith, said chamber having a diameter much larger than that of said opening, and means to introduce gas tangentially into said chamber at sufficient pressure and velocity to form a vortex between said arcing portion and opening and effect gas-constriction of an electric arc to said vortex and to a much smaller cross-sectional area than it would normally occupy in space, said gas flowing smoothly around said rounded edge and expanding through said opening.

46. In an electrical plasma-jet torch apparatus, a nozzle electrode defining a nozzle opening and beveled at the inner end of said opening, a back electrode spaced opposite said inner end, means to pass gas vortically between said electrodes and then out said opening, and means to apply positive direct voltage to said back electrode and negative direct voltage to said nozzle electrode.

47. In a plasma-jet torch, a generally disc-shaped nozzle electrode having a nozzle opening provided centrally therein, a plate electrode having a relatively large surface disposed in spaced relationship from said nozzle electrode and generally coaxial therewith, said surface of said plate electrode having a protuberant region disposed opposite said opening and relatively adjacent said nozzle electrode, means to pass gas between said electrodes and out said opening, and means to maintain an electric arc between said nozzle electrode at said opening and said plate electrode at said protuberant region.

48. An electrical plasma-jet torch, which comprises a generally disc-shaped metal nozzle electrode having a round nozzle opening in the central portion thereof, the edge of said nozzle adjacent said plate and around said opening being beveled, a plate electrode formed of metal and having a generally frustoconical wall disposed coaxially with said nozzle opening and spaced therefrom, said frustoconical plate wall terminating in a generally radial arcing surface which is relatively adjacent said nozzle as compared to the outer portions of said frustoconical wall, means to pass gas vortically between said plate electrode and nozzle electrode to form a vortex extending from said arcing surface through said opening, and means to maintain an electric arc between said arcing surface and said nozzle at said opening.

49. The invention as claimed in claim 48, in which means are provided to apply positive direct voltage to said plate and negative direct voltage to said nozzle, in which said arcing surface is spaced from said nozzle a distance between about 0.3 and 2.0 times the diameter of said opening, and in which said gas means is adapted to cause the gas at the outer portion of the space between said nozzle and plate to have an absolute pressure at least 1.6 times the absolute ambient pressure on the side of said opening remote from said plate.

(References on following page)

References Cited in the file of this patent

UNITED STATES PATENTS

| | | | |
|---|---|---|---|
| 1,002,721 | Mathers | Sept. 5, | 1911 |
| 1,443,439 | Southgate | Jan. 30, | 1923 |
| 1,582,081 | Peck | Apr. 27, | 1926 |
| 1,587,197 | Southgate | June 1, | 1926 |
| 2,052,796 | Rava | Sept. 1, | 1936 |
| 2,059,236 | Holslag | Mar. 3, | 1936 |
| 2,093,821 | Southgate | Sept. 21, | 1937 |
| 2,095,651 | Ronji | Oct. 12, | 1937 |
| 2,215,108 | Nigra | Sept. 3, | 1942 |
| 2,284,351 | Wyer | May 26, | 1942 |
| 2,377,159 | Kurtz et al. | May 29, | 1945 |
| 2,478,525 | Cutrer | Aug. 9, | 1949 |
| 2,640,135 | Cobine | May 26, | 1953 |
| 2,646,492 | Ballard | July 21, | 1953 |
| 2,652,475 | Spencer | Sept. 15, | 1953 |
| 2,686,860 | Buck et al. | Aug. 17, | 1954 |
| 2,709,213 | Gibson | May 14, | 1955 |
| 2,768,279 | Rava | Oct. 23, | 1956 |
| 2,769,079 | Briggs | Oct. 30, | 1956 |
| 2,770,708 | Briggs | Mar. 13, | 1956 |
| 2,806,124 | Gage | Sept. 10, | 1957 |
| 2,858,411 | Gage | Oct. 28, | 1958 |
| 2,868,950 | Gage | Jan. 13, | 1959 |
| 2,874,265 | Reed et al. | Feb. 17, | 1959 |

FOREIGN PATENTS

| | | | |
|---|---|---|---|
| 448,078 | Germany | Aug. 3, | 1927 |

OTHER REFERENCES

"Zeitschrift für Physik," Bd. 138, S. 170–182 (1954).